(12) United States Patent (10) Patent No.: US 9,135,574 B2
Matignon et al. (45) Date of Patent: Sep. 15, 2015

(54) CONTEXTUAL DECISION LOGIC ELICITATION

(71) Applicant: Sparkling Logic, Inc., Sunnyvale, CA (US)

(72) Inventors: Carole-Ann Matignon, Woodland Park, CO (US); Carlos Serrano-Morales, Sunnyvale, CA (US)

(73) Assignee: Sparkling Logic, Inc., Sunnyvale, CA (US)

( * ) Notice: Subject to any disclaimer, the term of this patent is extended or adjusted under 35 U.S.C. 154(b) by 0 days.

(21) Appl. No.: 14/564,952

(22) Filed: Dec. 9, 2014

(65) Prior Publication Data

US 2015/0095269 A1 Apr. 2, 2015

Related U.S. Application Data

(63) Continuation-in-part of application No. 14/047,188, filed on Oct. 7, 2013, now Pat. No. 8,909,578, which is a continuation of application No. 13/187,371, filed on Jul. 20, 2011, now Pat. No. 8,554,711.

(60) Provisional application No. 61/366,141, filed on Jul. 20, 2010.

(51) Int. Cl.
  *G06N 5/00* (2006.01)
  *G06N 99/00* (2010.01)
  *G06N 5/02* (2006.01)

(52) U.S. Cl.
  CPC ............... *G06N 99/005* (2013.01); *G06N 5/02* (2013.01); *G06N 5/027* (2013.01)

(58) Field of Classification Search
  None
  See application file for complete search history.

(56) References Cited

U.S. PATENT DOCUMENTS

| | | | |
|---|---|---|---|
| 6,684,192 B2 | 1/2004 | Honarvar et al. | |
| 6,708,155 B1 | 3/2004 | Honarvar et al. | |
| 6,876,991 B1 | 4/2005 | Owen et al. | |
| 7,321,883 B1 | 1/2008 | Freedy et al. | |
| 7,401,059 B1 | 7/2008 | Owen et al. | |
| 7,596,538 B1 | 9/2009 | Owen et al. | |
| 8,185,463 B1 * | 5/2012 | Ball | 705/36 R |
| 2002/0091687 A1 | 7/2002 | Eglington | |
| 2003/0187699 A1 * | 10/2003 | Bonissone et al. | 705/4 |
| 2005/0091012 A1 | 4/2005 | Przytula et al. | |

(Continued)

OTHER PUBLICATIONS

Davenport and Harris; "Automated Decision Making Comes of Age", MITSload, Management Review, Jul. 15, 2005. Accessed Jul. 24, 2013. http://sloanreview.mit.edu/article/automated-decision-making-comes-of-age/.

(Continued)

*Primary Examiner* — Alan Chen
(74) *Attorney, Agent, or Firm* — The Mueller Law Office, P.C.

(57) ABSTRACT

Disclosed herein is a method of managing decision logic. The method includes receiving data, storing the data, and receiving a set of rules. A decision is generated based at least in part on the data and on the set of rules, and is a part of the decision logic. The decision logic is managed in a first mode or a second mode. When in the first mode or the second mode, the set of rules is managed in the context of the data by a first user. The managing includes reviewing and editing the set of rules for the decision logic in the context of the data. The editing is done by at least one of (i) modifying a rule in the set of rules, (ii) creating another rule and adding it to the set of rules and (iii) making an exception to a rule in the set of rules.

20 Claims, 31 Drawing Sheets

(56) References Cited

U.S. PATENT DOCUMENTS

| | | | |
|---|---|---|---|
| 2006/0047540 A1* | 3/2006 | Hutten et al. | 705/4 |
| 2006/0100912 A1* | 5/2006 | Kumar et al. | 705/4 |
| 2006/0111933 A1 | 5/2006 | Wheeler | |
| 2007/0027919 A1 | 2/2007 | Mastel | |
| 2007/0168308 A1 | 7/2007 | Wang et al. | |
| 2008/0208786 A1 | 8/2008 | Serrano-Morales et al. | |
| 2009/0119133 A1* | 5/2009 | Yeransian et al. | 705/4 |
| 2010/0063903 A1 | 3/2010 | Whipple et al. | |
| 2010/0205616 A1* | 8/2010 | Lai et al. | 719/320 |
| 2010/0223211 A1 | 9/2010 | Johnson et al. | |

OTHER PUBLICATIONS

International Search Report and Written Opinion dated Nov. 23, 2012 for PCT Application No. PCT/US2011/044748.

Power, "Characteristics of DSS." Decision Support Systems. Westport, CT: Quorum Book, Mar. 30, 2002. 6. Print.

Power, "Henry Morris Interview: Decision Support and Analytic Applications", Dec. 3, 2006, Accessed on Jul. 21, 2013. http://dssresources.com/interviews/morris/morris12032006.html.

Power, "What is decision automation?", DSS News, Jul. 4, 2004, vol. 5, No. 14, DSSREsources.Com, Accessed on Jul. 24, 2013. http://tx.liberal.ntu.edu.tw/TxComm/&InfoMgt/Literature/!DSS/decision%20automation.txt.

Samild, "Decision Support Versus Decision Automation", Analyst First, Jun. 23, 2011. Access on Jul. 24, 2013. http://analystfirst.com/2011/06/23/135/decisionsupport-versus-decision-automation/.

Taylor and Raden, "Characteristics of Decision-Making Problems", Smart (enough) Systems: How to Deliver Competitive Advantage by Automating the Decisions Hidden in Your Business, Upper Saddle River, NJ: Prentice Hall, Jun. 2007. 48-49. Print.

* cited by examiner

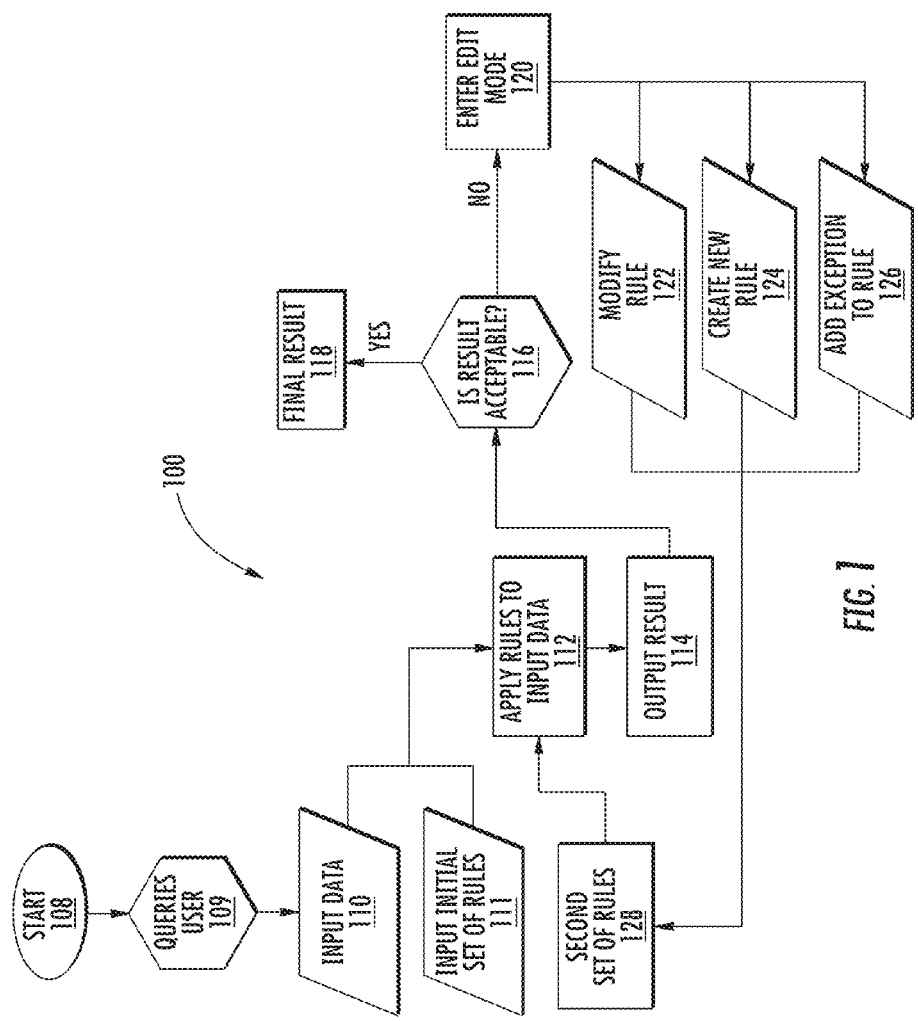

362   360   364

PATIENT #0234567                    [PROCESS CASE]

Food Allergy Pre-Screening Test
Complete the following form to determine whether a visit to a food allergist would be a good idea. Take the form with you to your family doctor or allergist to assist in your diagnosis.
I have the following symptoms a couple minutes to 2 hours after eating or drinking:

| Symptom | Food or Beverage | Amount consumed |
|---|---|---|
| ☐ Tingling or itching in and around the mouth | | |
| ☐ Swelling of the tongue and throat | | |
| ☐ Flushing of the face or neck | | |
| ☐ Rash | | |
| ☐ Eczema | | |
| ☐ Hives and swelling | | |
| ☐ Vomiting | | |
| ☐ Abdominal cramps | | |
| ☐ Diarrhea | | |
| ☐ Wheezing | | |
| ☐ Difficulty breathing | | |
| ☐ Drop in blood pressure (feeling faint or weak) | | |
| ☐ Loss of consciousness | | |

Symptoms commonly arise within ___ (minutes/hours) after eating or drinking and last ___ (minutes/hours) after eating or drinking.
I first noticed these symptoms ___ (days/months/years ago).
I have had similar symptoms ___ times in the past.
I have treated my reactions with: ___, ___, ___, with the following results:

DIAGNOSIS ON __/__/__ _____
RATIONALE: _____

FIG. 3

PATIENT #0234567 — 460 — 470 [PROCESS CASE]

Patient #0234567

Context: "Diagnosis" decision
Current decision results:
　No decision result has been To set the result of the "Diagnosis" decision, select them on the Tell us what Diagnosis sould be set
Diagnosis:_____
(Note: In general, Rationale is also used as a result of the "Diagnosis" decision)

Complete t...
be a good...
in your dia...
I have the...

462

☐ Tin...
　and
☐ Swe
　and
☐ Flus
　nec
☐ Ras
☐ Ecz
☐ Hiv
☐ Von
☐ Abd
☐ Dia
☐ Wh
☐ Diff
☐ Dro
　(fe
☐ Loss of consciousness Page 1

Symptoms commonly arise within ____ (minutes/hours) after eating or drinking and last _____ (minutes/hours) after eating or drinking.
I first noticed these symptoms _____ (days/months/years ago)
I have had similar symptoms ____ times in the past.
I have treated my reactions with: ____, ____, ____, with the following results:

DIAGNOSIS ON __/__/__
RATIONALE: _____

FIG. 4

PATIENT #0234567

Food Allergy Pre-Screening Test

Complete the following form to determine whether a visit to a food allergist would be a good idea. Take the form with you to your family doctor or allergist to assist in your diagnosis.

I have the following symptoms a couple minutes to 2 hours after

| Symptom | Food or Beverage | Amount co |

- ☐ Tingling or itching in and around the mouth
- ☐ Swelling of the tongue and throat
- ☐ Flushing of the face or neck
- ☐ Rash
- ☐ Eczema
- ☐ Hives and swelling
- ☐ Vomiting
- ☐ Abdominal cramps
- ☐ Diarrhea
- ☐ Wheezing
- ☐ Difficulty breathing
- ☐ Drop in blood pressure (feeling faint of week)
- ☐ Loss of consciousness Symptoms commonly arise within ___ (minutes/hours) often and last ___ (minutes/hours) after eating or drinking.
I first noticed these symptoms ___ (days/months/years ___
I have had similar symptoms ___ times in the past.
I have treated my reactions with:
following results:

DIAGNOSIS ON ___ /___ /___
RATIONALE:

---

PROCESS CASE

Patient #0234567

Context: "Diagnosis" decision
Current decision results:
No decision result has been assigned To set the result of the "Diagnosis" decision, select them on the form Tell us what Diagnosis sould be set to:
Diagnosis:

[h] Note: This field is used as the result of the "Diagnosis" decision in other rules
(Note: In general, Rationale is also used as a result of the "Diagnosis" decision)

[f] To set the circumstances under which the result of the "Diagnosis" decision is set as above, select the fields that justify it in the form
Tell us when "Tingling or aching in and around the mouth" leads to the result:
– Is it's presence?
– Is it's absence?
– Do you want to keep track of this and not use it yet?
– Do you want to get information from the system on its relevance?
Note: This field is used as a filter in the "Diagnosis" decision in less than 5% of the rules. It is always used with "Swelling of the tongue and Throat".

[h] Note: For the current documents set, this field is tested only in rules that lead to the "major sugar allergy" result Page 1

PROCESS CASE

PATIENT #0234567

Food Allergy Pre-Screening Test

Complete the following form to determine whether a visit to a food allergist would be a good idea. Take the form with you to your family doctor in your diagnosis.

I have the following symptoms a couple minutes to 2 hours of

| Symptom | Food or Beverage | Amount |
|---|---|---|
| ☐ Tingling or itching in and around the mouth | | |
| ☐ Swelling of the tongue and throat | | |
| ☐ Flushing of the face or neck | | |
| ☐ Rash | | |
| ☐ Eczema | | |
| ☐ Hives and swelling | | |
| ☐ Vomiting | | |
| ☐ Abdominal cramps | | |
| ☐ Diarrhea | | |
| ☐ Wheezing | | |
| ☐ Difficulty breathing | | |
| ☐ Drop in blood pressure (feeling faint of week) | | |
| ☐ Loss of consciousness | | |

Symptoms commonly arise within ___ (minutes/hours) and last ___ (minutes/hours) after eating or drinking
I first noticed these symptoms ___ (days/months/year)
I have had similar symptoms ___ times in the past.
I have treated my reactions with ___
following results:

DIAGNOSIS ON __/__/__
RATIONALE:

---

770

Patient #0234567                                   Page 3
Context: "Diagnosis" decision
Current decision results:
No decision result has been assigned You have selected to
 Set Diagnosis to: "Major Honey Allergy"
When
 Tingling or aching around the mouth is present and severe
and
 Patient noticed the symptom after eating "Honey"

[j] The system will track

Cases where Tingling or aching in and around the mouth is present and mild and where Diagnosis is "Major Honey Allergy"
Cases where Diagnosis is "Sugar Allergy"
Cases where Diagnosis is "Major Honey Allergy" and where age of patient is between 10 and 21 years old The system will notify on Cases where Diagnosis is "Major Honey Allergy" and where Patient's Medical History contains "Diabetes"

| | AverageAge >= | AverageAge < | TotalMileage >= | TotalMileage < | ReplyInformation. MaxAccidents >= | ACTION |
|---|---|---|---|---|---|---|
| ●10 | 16 | 25 | | | | RiskLevel ="High Risk" |
| ●31 | 25 | 45 | | 5000 | | RiskLevel ="Standard risk" |
| ●14 | 45 | 55 | 5000 | | | RiskLevel ="Low Risk" |
| ● | 45 | 55 | | 5000 | | RiskLevel ="Medium Risk" |
| ●21 | 55 | 75 | 5000 | | | RiskLevel ="Standard Risk" |
| ● | 55 | 75 | | | | RiskLevel ="Medium Risk" |
| ●15 | 55 | 75 | | 5000 | 1 | RiskLevel ="High Risk" |

| | | |
|---|---|---|
| DEDUCTIBLE COLLISION | 3,000.00 | |
| ADDITIONAL INFORMATION | | |
| ▲ REPLY INFORMATION | | |
| MAXIUM ACCIDENTS | 1 | |
| AVERAGE WORK/SCHOOL MILEAGE | 24.00 | |
| TOTAL WORK/SCHOOL MILEAGE | 24 | |
| AVERAGE AGE | 27.00 | |
| USED IN 24 CONDITIONS AND 0 ACTIONS | 0 | |
| REJECT REASON | | |
| CALCULATED RISK SCORE | 580 | |
| APPROVE AT | 2,000.00 | |
| INTERMEDIATE COMPUTED STATUS | APPROVED | |
| ASSIGNED RISK LEVEL | STANDARD RISK | |
| ▲ KEY METRICS | | |
| TOTAL PREMIUMS | 144,500.00 | |
| AGE GROUP | ADULT | |
| OCCUPATION GROUP | UNKNOWN | |
| GEOGRAPHIC GROUP | 95 | |
| TOTAL DAILY COMMUTE MILEAGE | 24 | |
| TOTAL NUMBER OF TICKETS | 0 | |

Labels 1614, 1616 point to TOTAL WORK/SCHOOL MILEAGE and AVERAGE AGE rows.

CONTEXTUAL DECISION LOGIC ELICITATION

CROSS REFERENCE TO RELATED APPLICATIONS

This patent application is a continuation-in-part of U.S. patent application Ser. No. 14/047,188 filed Oct. 7, 2013, which is a continuation of U.S. patent application Ser. No. 13/187,371 filed Jul. 20, 2011, now U.S. Pat. No. 8,554,711 issued Oct. 8, 2013, which claims the benefit of U.S. Provisional Patent No. 61/366,141 filed Jul. 20, 2010. The contents of U.S. patent application Ser. No. 14/047,188 filed Oct. 7, 2013; U.S. patent application Ser. No. 13/187,371 filed Jul. 20, 2011, now U.S. Pat. No. 8,554,711 issued Oct. 8, 2013; and U.S. Provisional Patent No. 61/366,141 filed Jul. 20, 2010 are incorporated herein by reference.

BACKGROUND OF THE INVENTION

Capturing decision logic is a mandatory activity of any decision automation project. Ultimately, business users want to be empowered and allowed to create and maintain business rules without technical assistance.

The complexity of decision logic elicitation stems from the fact that Subject Matter Experts (SMEs) are forced to think exhaustively about any and all rules that govern their business. This activity not only requires a lot of time but is also foreign to most SMEs because it is out of the realm of their normal day-to-day workflow. More often than not, incomplete decision logic which does not reflect how the business effectively operates is made, then several iterations are required to complete the process. This elicitation process does not guarantee that the resulting logic is in line with the company's business objectives.

In the prior art, the approaches to solve this issue have relied on heavy up-front investment along with long and wide preparation phases to mitigate the risk. Some examples include the creation of centers of excellence, the involvement of scarce and expensive specialists from vendor firms and the use of System Integrators (SIs) which is a person or company that specializes in bringing together component subsystems into a whole and ensuring those subsystems function together.

Some companies have developed a business around decision logic capture using methodology or software. Such solutions guide SMEs through the elicitation process to translate requirements into a form that is closer to a business rules format. In these solutions, the requirements represent the source business rules to be encoded.

Companies have also developed various systems based on using decision metaphors, rule templates, case-based reasoning, expert interviewing, or ripple-down rule creation. Decision metaphors are used to represent rules in a more graphical form, for example, decision trees, decision table, decision graph, decision flow, or scorecard. In certain circumstances, these are easy to manipulate by business users. The rule templates approach provides business users with specific tailored applications that enable the user to have an application specific view on decisions. The case-based reasoning approach relies on a large database of solved cases against which new cases are compared allowing the selection of closest cases and the assignment of the corresponding decision result. Expert interviewing constructs decisions through successive interviews of experts following one or another methodology. Finally, the approach using ripple-down rules uses cases to gradually refine an exception-based directed acyclic graph of conditions ending in actions that define a decision.

SUMMARY OF THE INVENTION

Disclosed herein is a non-transitory computer readable medium storing a program that when executed by a processor performs the method of managing decision logic. The method of managing decision logic includes receiving data, storing the data in a computer memory, and receiving a set of rules for the decision logic. A decision is generated based at least in part on the data and on the set of rules, and is a part of the decision logic. The decision logic is managed in a first mode or a second mode. When in the first mode or the second mode, the set of rules for the decision logic is managed in the context of the data by a first user. The managing includes reviewing the set of rules for the decision logic in the context of the data. The managing includes editing the set of rules for the decision logic in the context of the data. The editing is done by at least one of (i) modifying a rule in the set of rules, (ii) creating another rule and adding it to the set of rules and (iii) making an exception to a rule in the set of rules.

Also, disclosed herein is a non-transitory computer readable medium storing a program that when executed by a processer performs the method of investigating decision logic. The method includes receiving data, storing the data in a computer memory and receiving a set of rules for the decision logic. A decision based at least in part on the data and on the set of rules is generated. The decision is a part of the decision logic. When in a first investigative mode, a first graphical indicator is displayed to a user. The first graphical indicator is associated with the data and represents information associated with the set of rules of the decision logic. When in a second investigative mode, a second graphical indicator is displayed to the user. The second graphical indicator is associated with the set of rules of the decision logic and represents information associated with the data. The user switches between the first investigative mode and the second investigative mode based on a preference of the user. The second graphical indicator is a graphical rules editor. The second graphical rules editor includes at least one of (i) a first option to create a new rule based on the selected contextual data, (ii) a second option to create a new exception rule to an existing rule in the set of rules based on the selected contextual data, and (iii) a third option to modify the existing rule in the set of rules based on the selected contextual data.

The present invention is better understood upon consideration of the detailed description below in conjunction with the accompanying drawings and claims.

BRIEF DESCRIPTION OF THE DRAWINGS

FIG. 1 illustrates a flowchart of the overall process of the present invention;

FIG. 3 depicts a form-based data collection technique;

FIG. 4 depicts a wizard user interface;

FIG. 5 shows the wizard tool providing the user with guidance;

FIG. 6 illustrates the wizard tool providing immediate feedback on the impact of the change;

FIG. 7 depicts the wizard tool enabling the user to create or subscribe to decision results and business outcome metrics;

FIG. 9 is a form-based interface for the Automobile Insurance Redpen Edit Mode example;

FIG. 13 illustrates the metrics of implementing the new rule compared to the previous rule for the Automobile Insurance Redpen Edit Mode example;

FIG. 14 shows adding an exception rule to the new rule for the Automobile Insurance Redpen Edit Mode example;

FIG. 16 depicts an example embodiment for managing the decision logic in a first mode;

FIG. 17 is an example embodiment for managing the set of rules for the decision logic in the context of the data by editing, while in the first mode;

FIG. 20 shows an example embodiment of a graphical representation;

FIG. 21 is an example embodiment for managing the set of rules for the decision logic;

FIG. 27 is an example embodiment of a first investigative mode for a method of investigating decision logic;

FIG. 28 illustrates an example embodiment for the first investigative mode for a method of investigating decision logic;

FIG. 29 depicts an example embodiment of a second investigative mode for a method of investigating decision logic; and FIG. 30 illustrates an example embodiment of the second investigative mode for a method of investigating decision logic.

DETAILED DESCRIPTION OF THE EMBODIMENTS

Figure 2A:
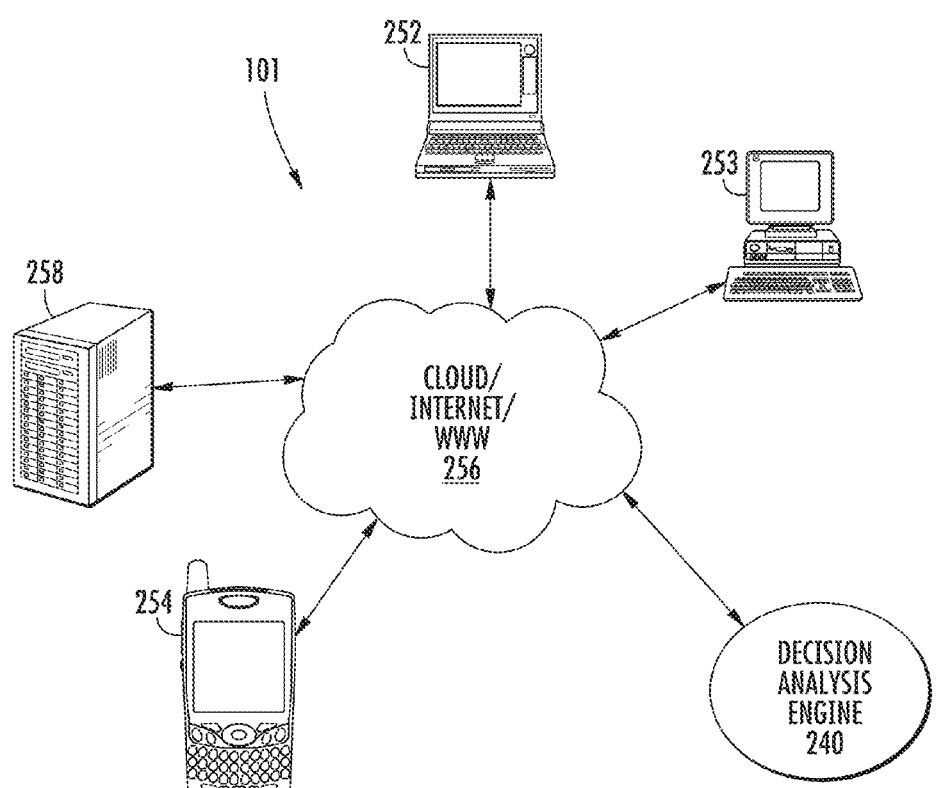
FIG. 2A depicts a communication system diagram of the present invention.

The following description is presented to enable a person of ordinary skill in the art to make and use the invention. Descriptions of specific materials, techniques, and applications are provided only as examples. Various modifications to the examples described herein will be readily apparent to those of ordinary skill in the art, and the general principles defined herein may be applied to other examples and applications without departing from the spirit and scope of the invention. Thus, the present invention is not intended to be limited to the examples described and shown, but is to be accorded the scope consistent with the appended claims. Reference now will be made in detail to embodiments of the disclosed invention, one or more examples of which are illustrated in the accompanying drawings.

The present invention provides an effective solution to the creation and capturing of decision logic in the context of every day operations by a business analyst user without forcing a change in his or her workflow while providing explanations as the decision results. The invention also focuses the SME's attention on Key Performance Indicators (KPIs) and previous decision logic that increase the quality of the captured decision logic. The invention helps reduce costs, reduce business cycles, and provide less rigid automated decision lifecycles. The invention does not require significant setup, is not specific to certain types of decisions, and does not require experts to create the decision logic.

FIG. 1 illustrates a flowchart of the overall process of the present invention. The process 100 starts at step 108. At step 109, the form-based interface queries a user for data and an initial set of rules. The user inputs data at step 110, and user inputs the initial set of rules at step 111. Note that step 111 may take place before step 110. Next, rules are applied to the data at step 112 and an output result is created at step 114. The output result is derived from the set of rules inputted at step 111. The user then has the option to accept the output result at step 116. If the output result is accepted by the user, this becomes a final result at step 118 and the process (or this stage of a large process) is complete.

If the user chooses not to accept the output result at step 116, the user may alter the output result by manipulating the initial set of rules in an edit mode at step 120. In this edit mode, the user may (i) modify an existing rule in the first set of rules at step 122, (ii) create a new rule in the first set of rules at step 124 and/or (iii) add an exception to an existing rule in the first set of rules at step 126. As a result, a second set of rules is provided at step 128. The input data is then applied to the second set of rules at step 112, and another output result is generated at step 114. Again, the user has the option to accept the output result at step 116. If the user accepts these output results, the process ends. The user may also manipulate the second set of rules again via steps 122, 124 and 126 after entering the edit mode at step 120. The method 100 continues in like fashion until the user accepts the output result at step 118 and the process ends.

FIG. 2A shows a communication system diagram incorporating an embodiment of the present invention. The communication system 101 generally includes a cloud service server (the server) 258, a variety of electronic devices 252, 253 and 254 and the decision analysis engine 240. The components 252-254 generally communicate through the Internet, the World Wide Web (Web) or a network "cloud" (the cloud) 256, except where it is appropriate or more convenient to use another communication technique as described herein.

The Internet is generally a global data communications system. It is a hardware and software infrastructure that provides connectivity between computers. In contrast, the Web is generally one of the services communicated via the Internet. It is generally a collection of interconnected documents and other resources, linked by hyperlinks and URLs. In many technical illustrations when the precise location or interrelation of Internet resources is not important, extended networks such as the Internet are often depicted as a cloud (e.g. 256 in FIG. 2A). The verbal image has been formalized in the newer concept of cloud computing. The National Institute of Standards and Technology (NIST) provides a definition of cloud computing as "a model for enabling convenient, on-demand network access to a shared pool of configurable computing resources (e.g., networks, servers, storage, applications, and services) that can be rapidly provisioned and released with minimal management effort or service provider interaction." Although the Internet, the Web and cloud computing are not exactly the same, these terms are generally used interchangeably herein, and they are referred to collectively as the cloud 256.

The electronic devices 252-254 are generally any appropriate devices that have access to the cloud 256, such as personal computers (workstation, desktop, laptop, tablet or iPad), cell phones (e.g. 254), Kindles, Blackberrys, iPhones, iPods, other PDAs (personal digital assistants), and many others. These devices 252-254 are preferably feature-rich with respect to communication capabilities, i.e. have built in capabilities to access the cloud 256. The electronic devices 252-254 generally preferably access any part of the cloud 256 through industry standard wired or wireless access points, cell phone cells or network nodes.

The server 258 is generally any appropriate computer or bank of computers operating server programs that enable access via the cloud 256 to data and applications stored or running therein. The server 258 generally implements the features that enable the electrical devices 252-254 to communicate with the cloud-based applications.

Figure 2B:
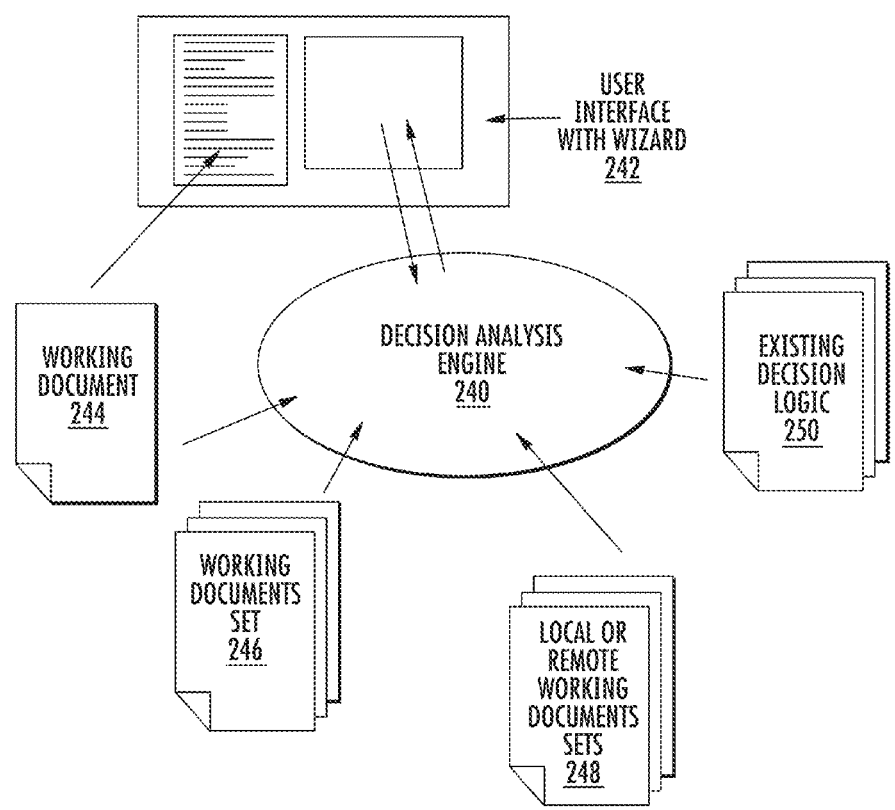
FIG. 2B shows the decision analysis engine interfacing with the various components.

The decision analysis engine 240 interfaces with the various components as described in FIG. 2B. FIG. 2B shows one embodiment of an overall structure of the present system. At the center of FIG. 2B, is the decision analysis engine 240 which interfaces with the various working documents 244, 246 and 248, the existing decision logic 250, and the user interface 242. The various working documents may be a working document 244 or a working document set 246, and may be located locally with the user or remotely 248.

FIG. 3 depicts one embodiment of the present system which is a form-based user interface 360. Form 360 may be similar or equal to the form used for managing the cases on which a decision is to be made. The interface allows the user to use form 360 to manipulate, for example one by one, all the working documents 244 (refer to FIG. 2B) within a documents set 246. It also allows the user to view the impact of automated and manual decisions on the documents in the documents set, primarily in terms of distribution of decision results and long term business outcomes. In one embodiment of the present system, the user may input data onto the form. In another embodiment of the present system, the inputted data on the form is generated from other data sources, internally or externally, such as a process, program or database.

The user may be presented with context 362 extracted from masses of cases that have been processed by the user or the set of users within their community. Context 362 may also be considered business rules for decision logic. The sources for context 362 includes, but is not limited to, information such as typical case segmentation, usual case processing, usual fields in the form that play a part in the decisions made by the rest of the users within their community, what type of role they play, and with which relevance. In one embodiment of the present system, the user may input a first set of rules to create the initial decision logic and present that information as the context to the user.

In other embodiments, a first set of rules 362 may be inputted internally or by multiple users working separately or collaboratively. In another embodiment, the first set of rules 362 and/or the second set of rules may be inputted by at least one user using near natural language for example, free text. In further embodiments, first set of rules 362 may be inputted externally, for example, by a wizard, an XML instruction file, a process, a workflow diagram, a program, a list of predetermined logical expressions or database. The second set of rules may also be inputted externally, for example, at least in part, by a list of predetermined logical expressions.

The user is presented with the option to process the case by manipulating the content of form 360 by editing. In one embodiment, a Redpen editing mode is used in which the user may electronically annotate (i.e. highlight or click) onto data displayed in the user interface to modify any automated rule initially provided, create a new rule thus adding a rule, or create an exception rule (refer also to FIG. 1; steps 122, 124, 126). The content of form 360 includes data 364 with a range or set of values in contextual fields. For example, referring to FIG. 3, a food allergy example, the user is queried for symptoms, the type of food or beverage consumed and the amount consumed. The user may manipulate the content of form 360 using electronic annotation in various ways, including but not limited to, circling, clicking, typing, or highlighting. The system may also present a range or set of values for the relevant contextual fields on the form.

To aid the user through the process, a software wizard tool or setup assistant may be used. This wizard tool is a user interface type that presents a user with a sequence of dialog boxes and leads the user through a series of well-defined steps. In other embodiments, the user may be guided through by drop-down menus or by an expert system which guides a user through a series of yes/no questions. Other commercially available techniques may be used to walk the user through the options.

FIG. 4 depicts one embodiment of the present system of a wizard user interface 470 (also referred to as the wizard) that guides the user through the process of selecting directly within original form 460, contextual fields 462 that are important to focus on. Wizard 470 guides the user through the process of configuring the role that relevant contextual fields play within the decision being modified or created. The system displays the role and importance of those contextual fields based on automated decisions or decision logic implemented at that point. The system then displays to the user which contextual fields on form 460 are important for the user to focus on, for example, by highlighting the relevant contextual fields with color-coding. This color-coding represents whether the field is used in rule conditions, actions or both, as well as quantitative feedback on the frequency of usage in the decision logic implemented at that point.

In one embodiment, the wizard first focuses on guiding the user toward the definition of what the decision result is, and how the decision logic implemented at that point leads to this business outcome. The wizard suggests to the user the contextual fields to use as part of the result based on automated decisions implemented at that point. The user adds contextual fields to include in the decision logic to be modified or added by selecting those fields in the context of the form. This is an important aspect of the invention as all existing decisioning systems require the user to type or select attributes in the abstract, in absence of data.

FIG. 5 shows how wizard 570 then provides the user with guidance in terms of what can be done with contextual fields 562 in order to make it contribute to the decision. This guidance is translated in terms of questions, and potentially, in terms of prompts 580 to test the result of computations on contextual field 562. The system will store the responses by the user in memory or persistent storage for future use. This memory or persistent storage may be located remote from the user devices. In one embodiment, this memory or persistent storage may be located in cloud service server 258 (refer to FIG. 2A).

The system analyzes the automated and manual decisions to identify potential logic issues. For example, but not restricted to these examples, it can recognize potential contradictions, repetitions, logical overlaps, or logical gaps. Contextual data available in the document set is analyzed by the system to detect inconsistencies due to the decision logic being modified or added to the decision logic implemented at that point. Contextual data may be forms, data sets, decision trees and graphs or business rules. In contrast, regular data may be the type included as text in a form, such as personal data on an application. The system also detects changes in decision logic that cause dramatic drifts in performance metrics based on the provided document set. The wizard provides guiding information to the user as to whether the logic being constructed is verified to be logically consistent. If inconsistencies exist, the wizard provides corresponding guidance to the user to resolve the possible issue. This feature of being able to promptly identify abnormalities is an important aspect of the present invention. In currently available systems, only logical contradictions may be recognized at the time of authoring; most contradictions can only be recognized after the business rule is established in production systems which may take weeks or months.

The user may determine what role, and the relevance of that role, of a particular contextual field in the output results. Wizard 570 may provide guiding information to the user as to the role of the contextual field in the decision, and how relevant that role is in determining the decision results as well as usage information to gauge the importance and correlation of those fields with the decisions 582.

The user has the ability to query the system for further detailed information. For example, but not restricted to this example, the user can ask what the best segmentation is for the values of a given contextual field for the purposes of satisfying certain decision results constraints.

Figure 6:
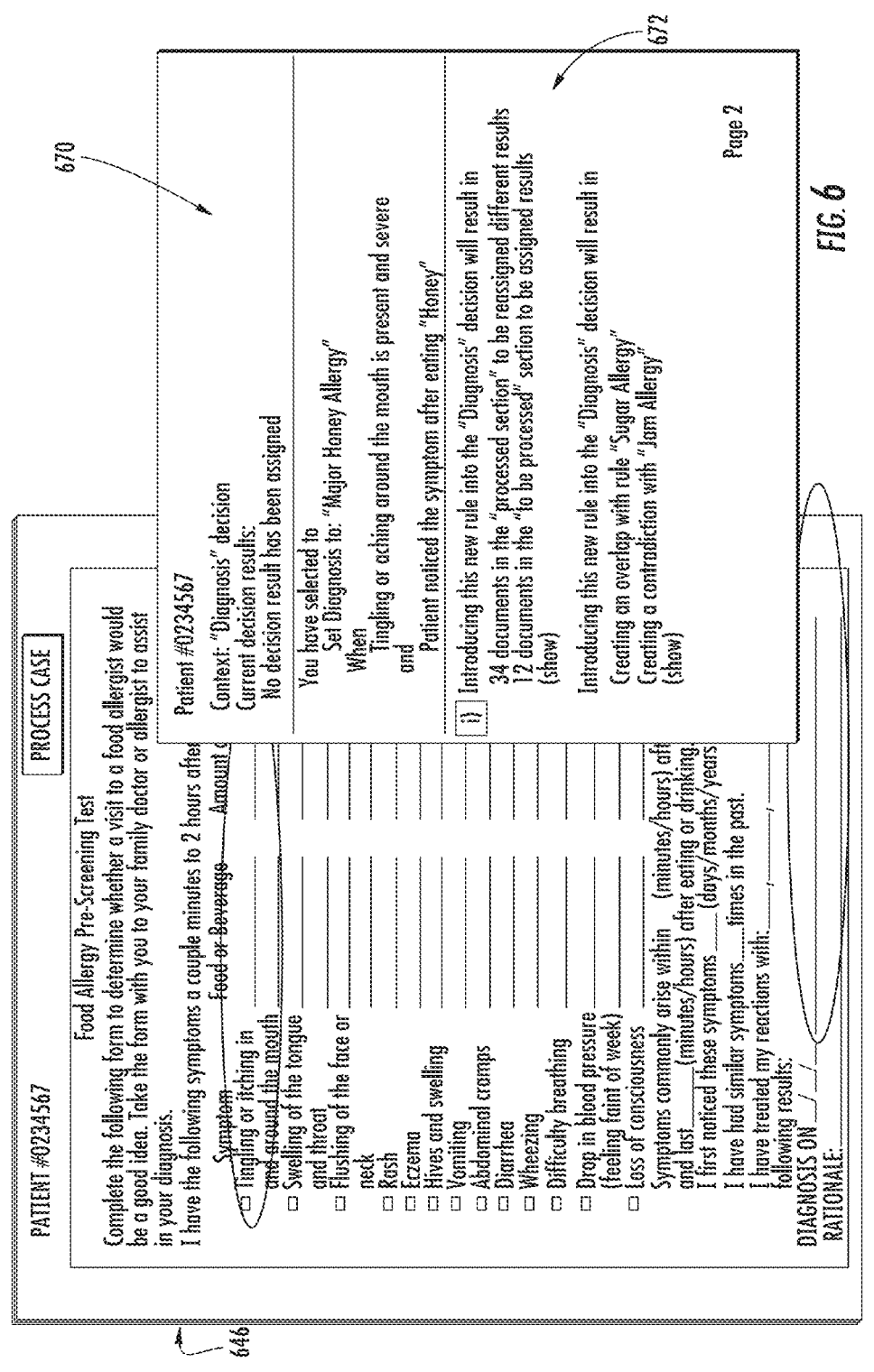

FIG. 6 illustrates how wizard 670 provides immediate feedback on the impact of the change in the decision logic on all documents in the document set 646 the user is utilizing in section 672. Also, the user may query to determine the corresponding impact on any relevant document set managed in the system. The impact may be presented graphically or in data list forms, for example, by tables, charts, decision trees or another method.

The majority of the new business rules generated by the system are based on the response to the queries by the user during the guidance process. The rules are aggregated from one or multiple users using the system over a period of time. The new set of rules applied by the user may be saved in a centralized repository, for example, in a cloud service server 258 (refer to FIG. 2A), so that future queries are handled using the new revised set of rules. In one embodiment, the pending working documents accessing the centralized repository will not be impacted, but all future working documents and electronic requests will be handled using the new set of rules applied to the decision analysis engine 240. In one embodiment, the new set of rules being applied by the user may have an associated weight value to help determine their priority in making a decision. In another embodiment, an aggregate set of rules are applied to a set of data in order to determine if a favorable result is reached. In one embodiment, the new set of rules may have a retro-active impact on completed and pending work documents. In another embodiment, the new set of rules may only impact the decision analysis engine 240 after the changes have been applied or saved to the centralized or local repository. In yet another embodiment, the new set of rules may only apply towards working document sets 246 without impact to the decision analysis engine 240.

FIG. 7 depicts how wizard 770 enables the user to create or subscribe to decision results and business outcome metrics, as well as to alerts relative to any combination of the decision context itself. This may include for example, but not restricted to these examples, unexpected values being seen by the deployed decisions for a particular contextual field or deviations with respect to an expected statistical distribution of results. Statistics could be performance based or distribution based.

In another embodiment of the present systems the same approach is taken to allow the user to create decision trees, decision tables, decision graphs and scorecards. In yet another embodiment of the present system, the user uses a similar approach, but focuses on the desired decision rather than the cases.

Two examples of specific embodiments will now be presented to demonstrate the present invention. The invention is not defined or limited by these examples, and the examples are merely presented for illustrative purposes.

Example 1

Automobile Insurance—Assess Risk and Determine Quote for Insurance Policy

Figure 8:
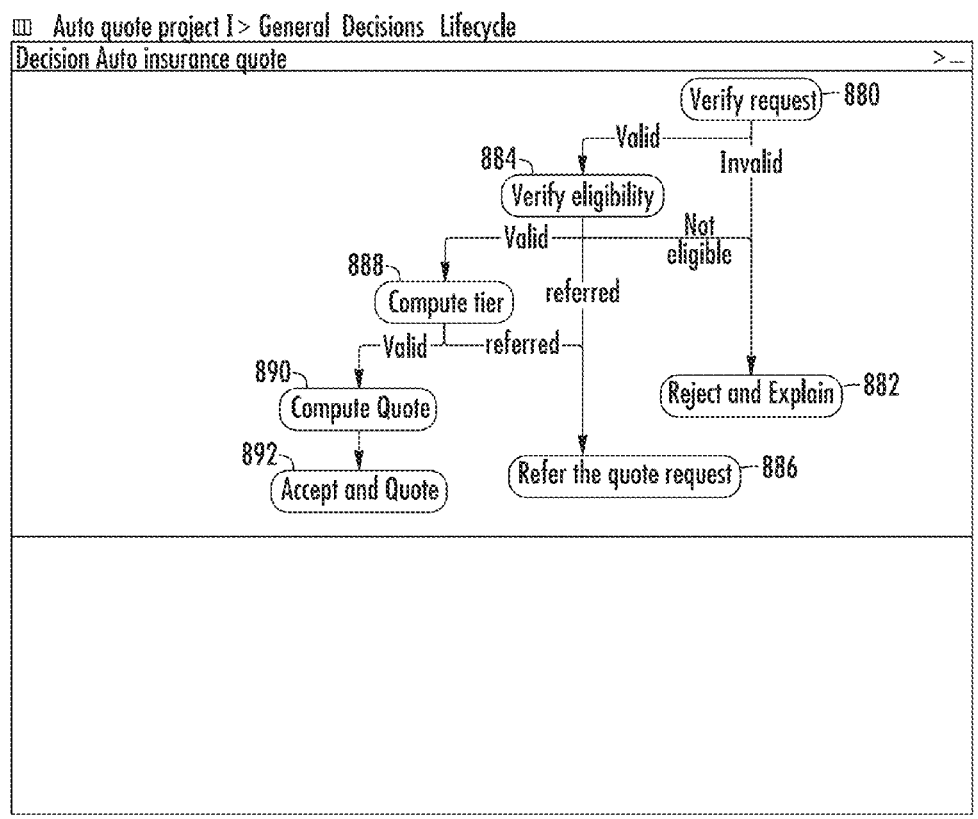
FIG. 8 is a flowchart for the decision process for determining the risk and quote for automobile insurance coverage.

An Automobile Insurance Agent is presented with a client seeking an automobile insurance policy. FIG. 8 is a flowchart for the decision process for determining the risk and quote for automobile insurance coverage. At step 880, the request is verified or checked for completeness. If the conditions are found to be invalid, or not eligible for coverage, at step 882, the client is rejected and notified of the reason. For example, a client may be rejected because there are three or more traffic violations on their driving record.

If the request is valid, at step 884, eligibility is verified. If the Agent feels that a specialist is required to further analyze the case, at step 886, the request is referred to a specialist. If the conditions are found to be not eligible for coverage at this point, the client is rejected and notified of the reason (back at step 882). However, if eligibility is verified, at step 888, the case is processed and the risk assessed. If the risk is very high, the case may be referred to a specialist (step 886) or at step 890, a quote is computed. At step 892, the Agent accepts the decision and quote.

In one embodiment, a business analyst user is presented with a form based interface with an initial set of rules. Examples of the rules may be a driver is considered standard risk if between the ages of 16 and 25 and drives less than 25 miles a day and has one or less violations on their driving record. Also, a driver is considered high risk if between the ages of 16 and 25 and drives greater than 25 miles a day and has one or less violations on their driving record. Next, the forms query the user to input information about the applicant, such as but not limited to, age, sex of driver, how many miles driven in a typical day, driving record and type of vehicle to insure. The user inputs data onto the form with the aid of a wizard such as the applicant is 22 years old, male, drives 40 miles a day, has one accident on their driving record and is seeking insurance for a 1999 model-year minivan. From this information, the system applies the initial set of rules to the data and generates a result. From this example, the applicant is considered high risk and the insurance quote is $2,000 per year.

The result, in this case risk and quote, is made up of a group of rules which can be manipulated in an edit mode. The business analyst user may want to determine which rules influenced the whole decision in order to potentially modify the decision. For example in one embodiment, by clicking on a decision, a decision step, a rule set or a rule, the form indicates, by highlighting, which fields participate in that piece of decision logic. In this example, the highlighted fields are the driver's age, the mileage driven per day and the amount of violations on their driving record. These are color-coded to reflect their role as input for the selected decision logic; the length of the highlighting reflects the number of rules that use each one of those fields as input. Output fields such as Risk Score are also color-coded to reflect their role in the decision logic and their importance. The user can select one or more fields in the form to highlight and optionally the rules that refer to the field in the condition or action part.

The user may choose to modify a specific rule, create a new rule or add an exception to a rule by entering the red pen editing mode. For this example, the user decides to modify the initial rule to a driver is considered standard risk if between the ages of 16 and 25 and drives less than 50 miles a day and has one or less violations on their driving record. Also, a driver is considered high risk if between the ages of 16 and 25 and drives greater than 50 miles a day and has one or less violations on their driving record. These modifications are made directly in the form by clicking on the fields to add or remove in the current rule, and specifying the appropriate values or ranges of values in-place. The rule set is automatically updated such that the user can visualize the corresponding rule in pseudo-English form. From this information, the system applies the data to this updated, or second set of rules, returning a result. From this example, the applicant is considered standard risk and the insurance quote is now $1,600 per year.

The user may also choose to create a new rule to the existing rule set. This is accomplished in the red pen editing mode by clicking on the appropriate fields and configuring the appropriate values or ranges of values to test against in the context of the form. The tests automatically default to the value of the field for the applicant being underwritten. For example, a new rule may be "If vehicle is older than a 2000 model-year then low risk". The user locates the field "year" in the "vehicle" section of the form and selects it. The user can modify the "vehicle year is 2000" directly in the form using overlaid stickers with this information to "vehicle is older than 2000". The user also selects the decision field to assign a "Low Risk" value in a similar fashion. From these changes, the system will apply the data to this third rule set and calculate a result. In this scenario, the applicant is considered standard risk and the insurance quote is now $1,400 per year.

The user may add an exception to a rule while in red pen edit mode. For example, an exception may be if an applicant is seeking insurance for a minivan model, then a driver is considered standard risk if between the ages of 16 and 25 and drives less than or greater than 50 miles a day and has one or less violations on their driving record. From these changes, the system will apply the data to this updated rule set and calculate a result. In this scenario, the applicant is considered low risk and the insurance quote is now $1,200 per year.

Example 1

Summary

TABLE 1

Summary of Example 1 - Automobile Insurance - Assess Risk and Determine Quote for Insurance Policy

| | |
|---|---|
| Data | 22 years old, male, commutes 40 miles/day, 1 accident on record, seeking insurance for a 1999 minivan |

TABLE 1-continued

Summary of Example 1 - Automobile Insurance - Assess Risk and Determine Quote for Insurance Policy

| | |
|---|---|
| Initial Rules | 16-25 years and commutes <25 miles/day and <2 violations on record = standard risk |
| | 16-25 years and commutes >25 miles/day and <2 violations on record = high risk |
| Results | High risk and $2,000/year for insurance |
| * | Modify rule |
| Second Rules | 16-25 years and commutes <50 miles/day and <2 violations on record = standard risk |
| | 16-25 years and commutes >50 miles/day and <2 violations on record = high risk |
| Results | Standard risk and $1,600/year for insurance |
| * | Create new rule |
| Third Rules | Vehicle is older than a 2000 model-year = low risk |
| Results | Standard risk and $1,400/year for insurance |
| * | Add exception rule |
| Fourth Rules | If seeking insurance for minivan, and 16-25 years and Commutes < or >50 miles/day and <2 violations on record = low risk |
| Results | Low risk and $1,200/year for insurance |

Example 2

Automobile Insurance Redpen Edit Mode

Figure 9:
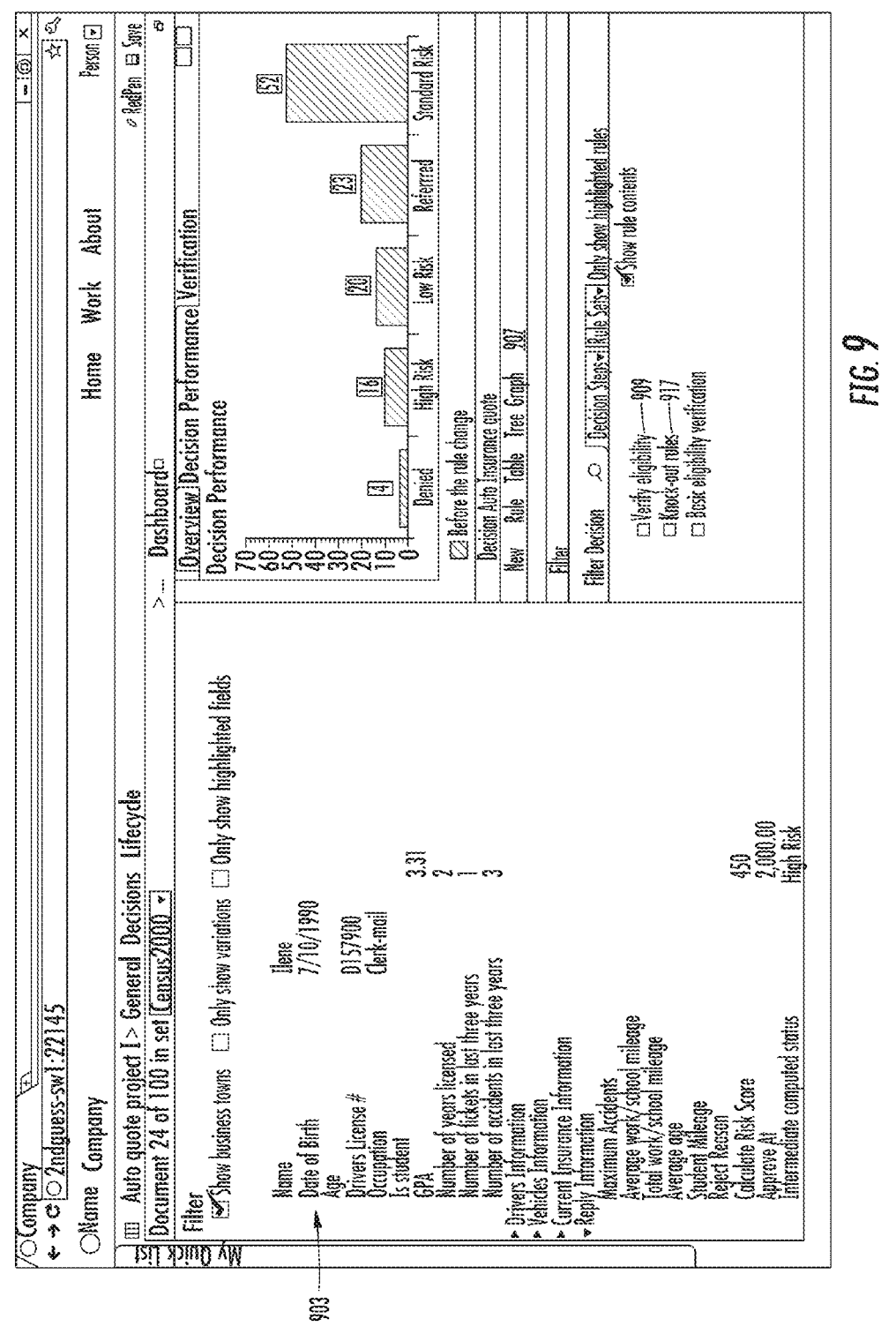

An Automobile Insurance Agent is presented with an applicant seeking an automobile insurance policy. FIG. 9 depicts a form-based interface for the present invention. Referring to FIG. 9, on the left section of the form 903, data is entered about the applicant. In panel Decision 907, the business rules are contained in folders, for example, Verify Eligibility 909. When the Agent clicks on Verify Eligibility 909, a sub-folder, Knock-out Rules 917 appears, but no rules exist yet. The system can be used to create an initial set of rules as illustrated in this example or to modify existing rules.

Figure 10:
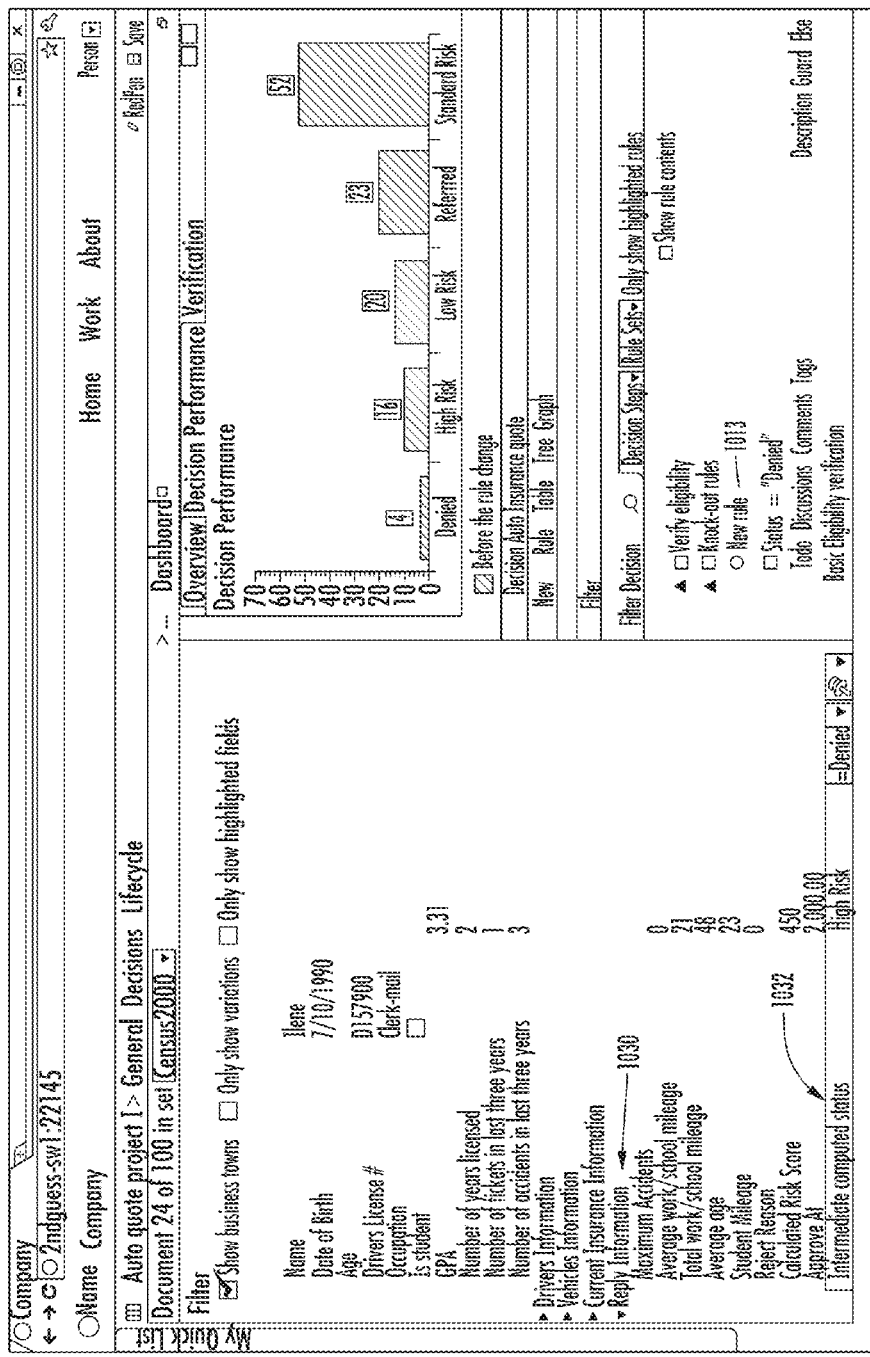
FIG. 10 depicts creating a new rule in the Redpen edit mode for the Automobile Insurance Redpen Edit Mode example.

FIG. 10 depicts creating a new rule in the redpen edit mode. Referring to FIG. 10, in Reply Information 1030, the Intermediate computed Status 1032 is High Risk. This means that the applicant is in a high risk group for the insurance policy. From the applicant data, the Agent notices that the applicant's age is 21 years and decides that if an applicant is aged 21 years, the applicant will be denied for insurance coverage instead of being in a high risk category. This business rule does not currently exist so the Agent enters the redpen editing mode to create the new rule.

With the aid of the wizard tool, the Agent clicks on High Risk in the Intermediate computed Status 1032 and selects 'denied'. This updated status is displayed in New Rule 1013. The newly created rule appears with a red marker to indicate that it is not applicable to the current document.

Figure 11:
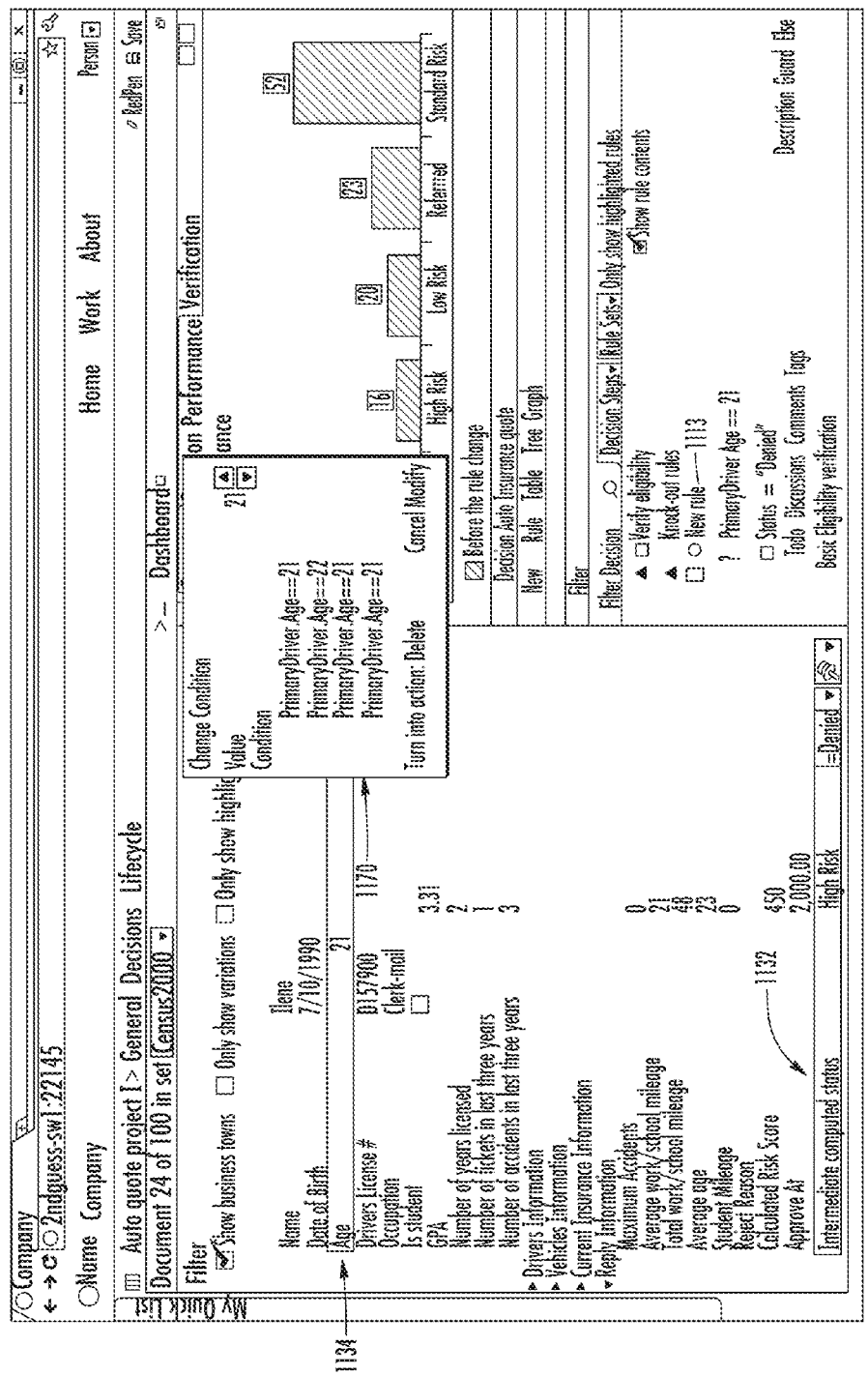
FIG. 11 demonstrates creating conditions to the new rule for the Automobile Insurance Redpen Edit Mode example.

FIG. 11 demonstrates creating conditions to the new rule. Age 1134 indicates by shading that it influences the overall decision as an input field. The Agent clicks on Age 1134 which creates a default condition which is that the age must be 21 to reach the conclusion previously configured and with the aid of the wizard tool 1170, chooses the condition that if the applicant's age is equal to 21 years, coverage will be denied. In this embodiment, the wizard tool involves clicking on a field to create an additional condition and selecting from drop-down menus at Age 1134 to alter the condition that influences Intermediate Computed Status 1232. The status of the new rule is automatically displayed in New Rule 1113. The rule marker now turns green to indicate that the applicant being reviewed is indeed 21 year-old or less and therefore the rule applies.

Figure 12:
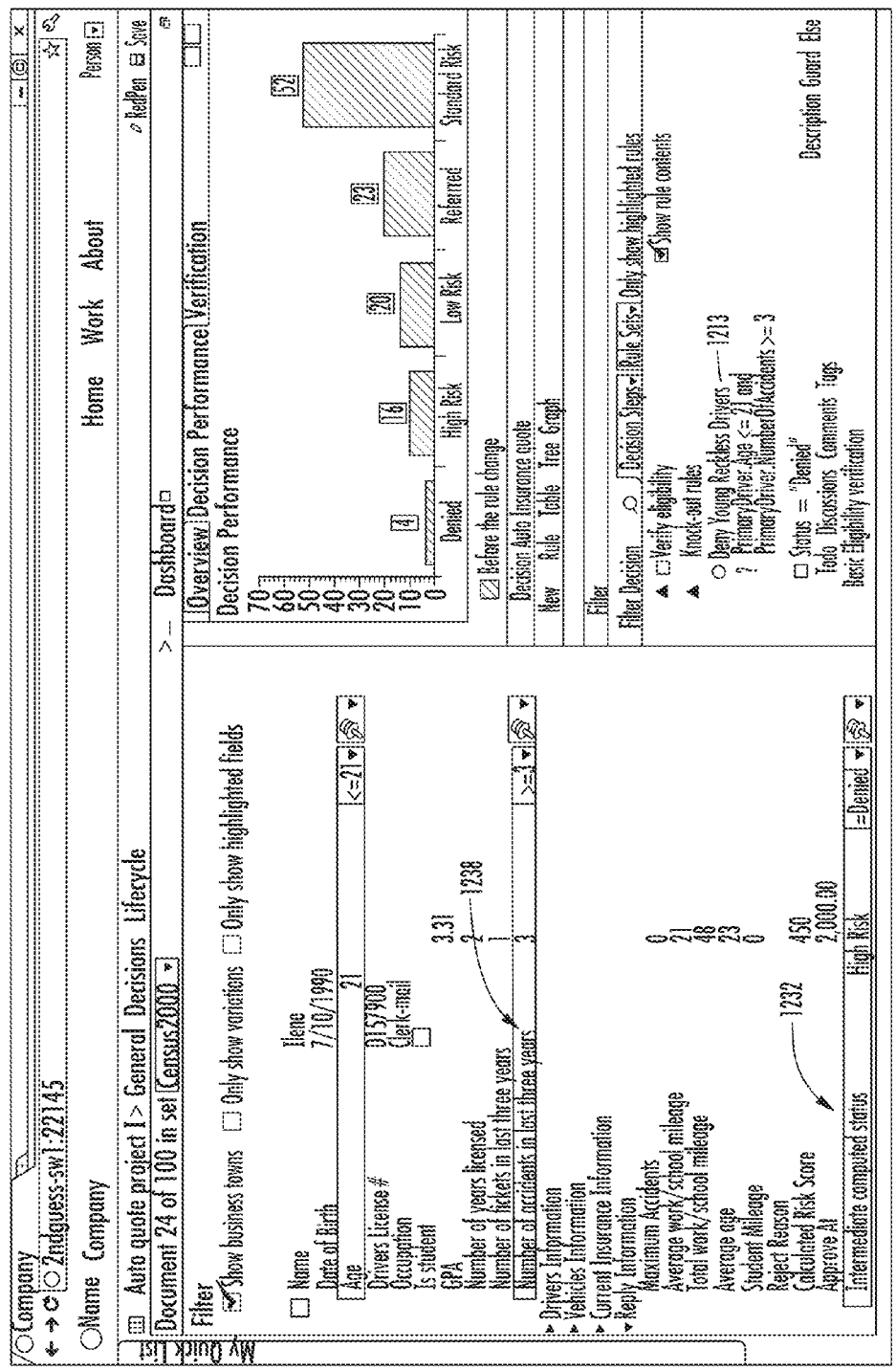
FIG. 12 demonstrates creating additional conditions to the new rule for the Automobile Insurance Redpen Edit Mode example.

The Agent may want to create additional conditions to the new rule. Referring to FIG. 12, Number of Accidents in Last Three Years 1238 indicates that it has not been leveraged yet in the existing decision logic as there is no shading. Again, with the aid of the wizard tool, an additional condition to the new rule may be created. In one embodiment, this involves clicking on Number of Accidents in Last Three Years 1238 to circle it therefore creating a new condition based on the existing value and then selecting from drop-down menus at Number of Accidents in Last Three Years 1238 to alter the conditions thus modifying the new rule. In this scenario, if an applicant has 3 or more accidents in the last three years, and the applicant is aged 21 years, the applicant is denied. This is displayed in New Rule 1213 which is now named by the Agent Deny Young Reckless Drivers 1213. The Agent may continue in this manner clicking on the applicant data to create as many conditions to the new rule as desired. Conditions can be modified or removed in place in the context of the form. The status or output of the new rule is displayed in New Rule 1213 which is named Deny Young Reckless Drivers 1213.

Figure 13:
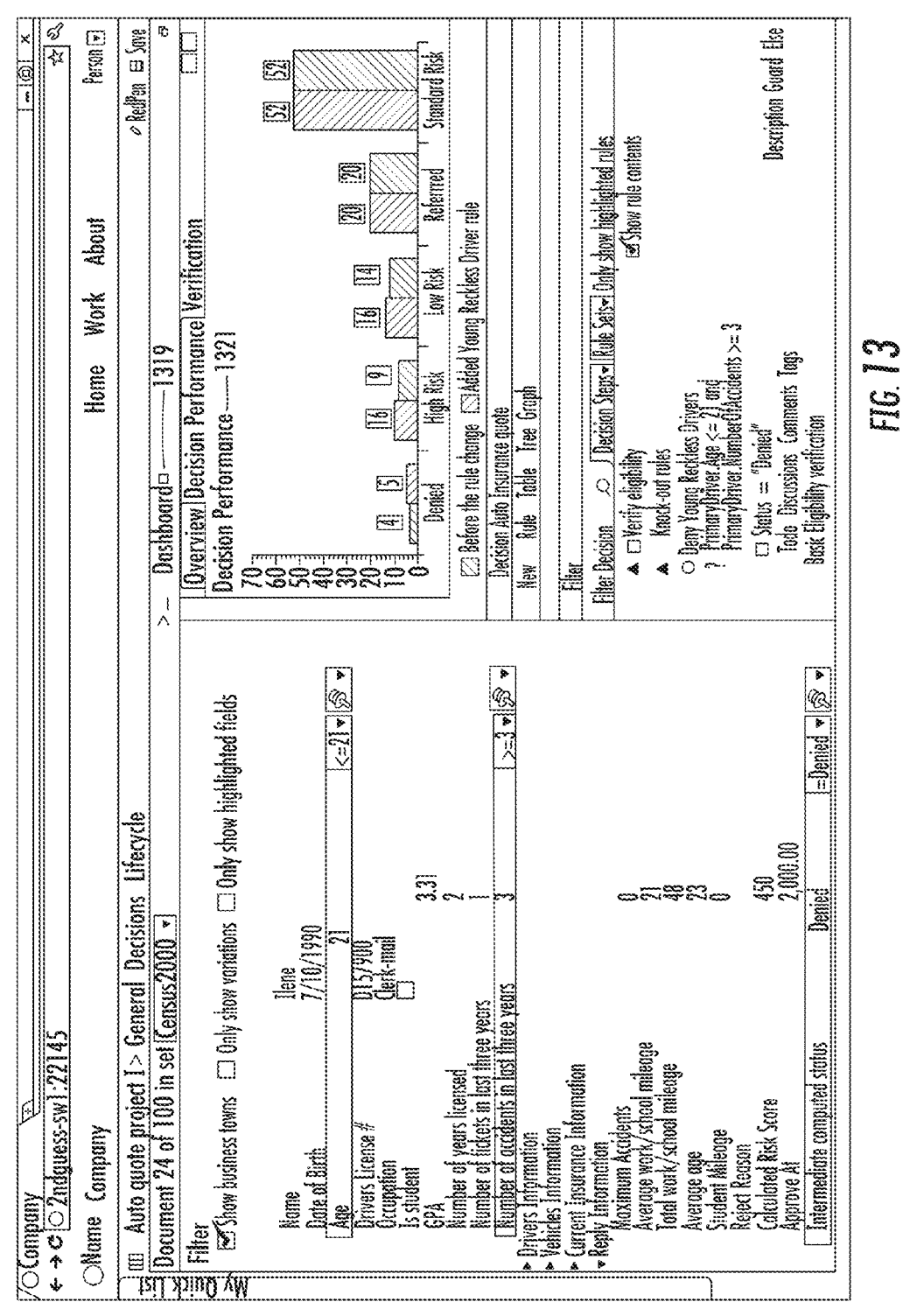

This new rule, Deny Young Reckless Drivers may be compared to the previous rule which was an applicant aged 21 years with three or more accidents on their driving record in the last three years qualifies for insurance in a high risk category. In FIG. 13, the Agent may click on Dashboard 1319 then Decision Performance 1321 to study the metrics of implementing the new rule compared to the previous rule.

Figure 14:
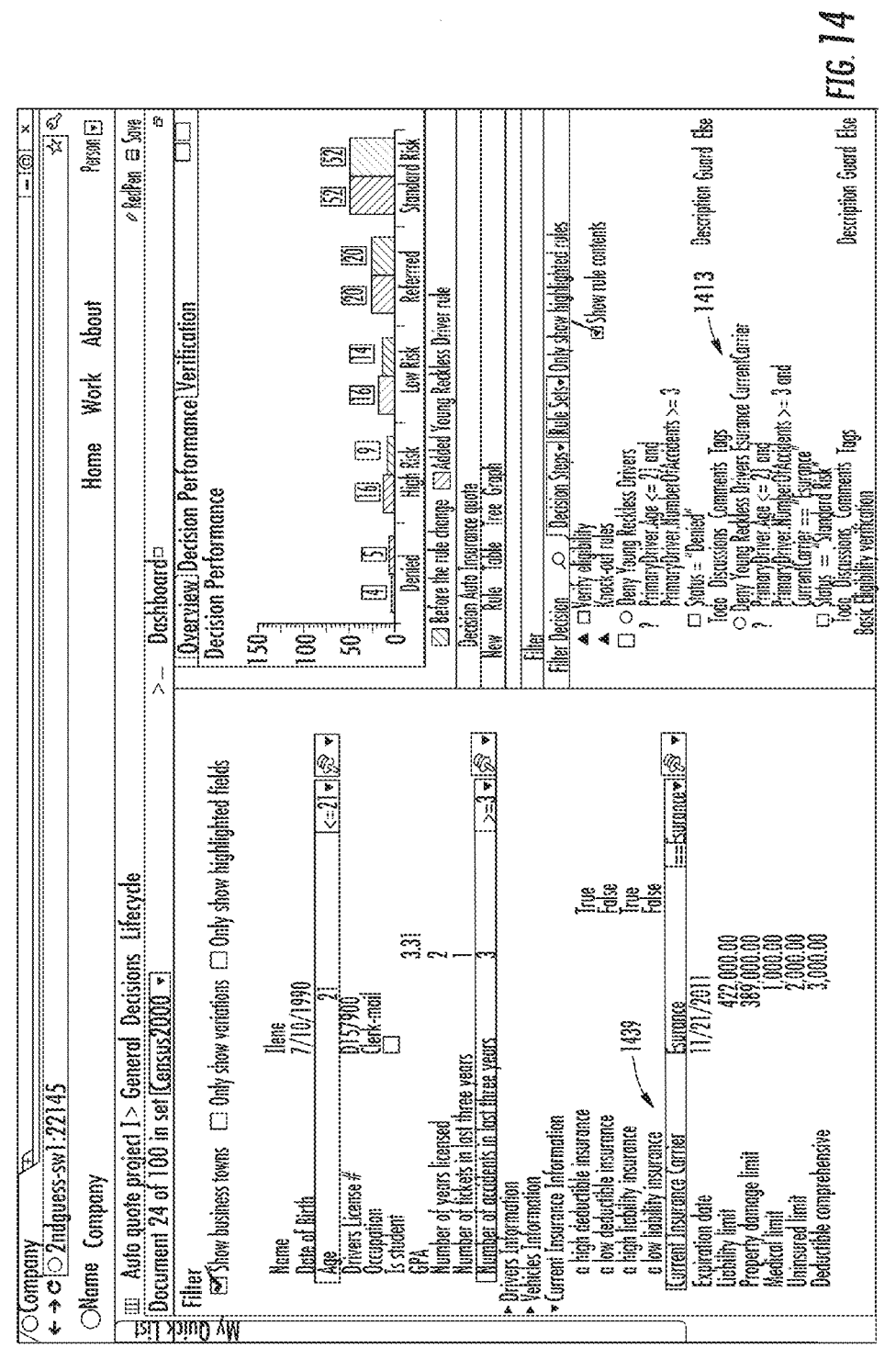

In the redpen editing mode, it is also possible to create an exception to the rule. Here, the new rule is an applicant aged 21 years with three or more accidents on their driving record in the last three years is denied coverage. The Agent may want to capture specific business from a competitor and therefore creates an exception to this rule. For example, referring to FIG. 14, the Agent may click on Current Insurance Carrier 1439 and discover the applicant's current insurance provider is, for example, Esurance. The Agent enters the redpen editing mode, selects create an exception, then clicks on Current Insurance Carrier 1439. With the guidance of the wizard tool, an exception to the new rule is automatically created. In one embodiment, this involves selecting from drop-down menus at Current Insurance Carrier 1439 in the form to alter the conditions thus creating an exception to the new rule. With this exception, the new rule is now an applicant aged 21 years or less with three or more accidents on their driving record in the last three years with Esurance as their current provider, qualifies for insurance in a standard risk category. This is displayed in New Rule 1413 which is now named Deny Young Reckless Drivers Esurance Current Carrier 1413.

A significant feature of the current invention is that rules are created dynamically without custom coding and within the context of data. Typically in the prior art, rules are created in the context of the rules relating to the rules, not the actual data, which requires the Agent to understand an abstract object model and to navigate it. In the present invention, a new rule may be created and modified by clicking on the data then the new rule is displayed. New rules can be graphically manipulated into the form or entered manually in the rules editor. Lastly, new rules are created by highlighting or clicking particular aspects of information as opposed to focusing on the syntax of if/then statements.

Disclosed herein is a non-transitory computer readable medium storing a program that when executed by a processer performs the method of managing decision logic. The method of managing decision logic includes receiving data, storing the data in a computer memory, and receiving a set of rules for the decision logic. A decision is generated based at least in part on the data and on the set of rules, and is a part of the decision logic. The decision logic is managed in a first mode or a second mode. When in the first mode or the second mode, the set of rules for the decision logic is managed in the context of the data by a first user. The managing includes reviewing the set of rules for the decision logic in the context of the data. The managing includes editing the set of rules for the decision logic in the context of the data. The editing is done by at least one of (i) modifying a rule in the set of rules, (ii) creating another rule and adding it to the set of rules and (iii) making an exception to a rule in the set of rules.

The first mode may be a text based representation including a form or report, and the second mode may be a graphical representation and including a table, tree or graph. The managing may be performed in the first mode or the second mode based on a preference of the first user. The first user may switch between the first mode and the second mode for managing the decision logic. In one embodiment, the managing may be performed by the first user and a second user at the same time when the first user and the second user are in the same mode. In another embodiment, the managing may be performed by the first user and a second user at the same time when the first user and the second user are in different modes. The managing and execution by the first user may occur simultaneously during the method of managing decision logic.

The method may further include when in the first mode, displaying a graphical indicator to the first user. The graphical indicator may be associated with the data. The graphical indicator may represent information associated with the set of rules of the decision logic. Additionally, the method may further include when in the second mode, displaying a graphical indicator to the first user. The graphical indicator may be associated with the data. The graphical indicator may represent information associated with the set of rules of the decision logic.

In one implementation, the method may further include when in the first mode, receiving a selection of selected contextual data from the user. An impact of the selected contextual data on the decision logic may be calculated and a graphical indicator may be displayed. The graphical indicator may show the impact of the selected contextual data on the decision logic. The impact may include at least one of (i) whether the selected contextual data is used in a rule, the rule being included in the set of rules, (ii) a frequency of usage of the selected contextual data in the decision logic, (iii) a role of the selected contextual data in determining the decision, and (iv) usage information indicating an importance and correlation of the selected contextual data with respect to the decision.

In another implementation, the method may further include when in the second mode, receiving a selection of selected contextual data from the user. An impact of the selected contextual data on the decision logic may be calculated and a graphical indicator may be displayed. The graphical indicator may show the impact of the selected contextual data on the decision logic. The impact may include at least one of (i) whether the selected contextual data is used in a rule, the rule being included in the set of rules, (ii) a frequency of usage of the selected contextual data in the decision logic, (iii) a role of the selected contextual data in determining the decision, and (iv) usage information indicating an importance and correlation of the selected contextual data with respect to the decision.

Figure 15:
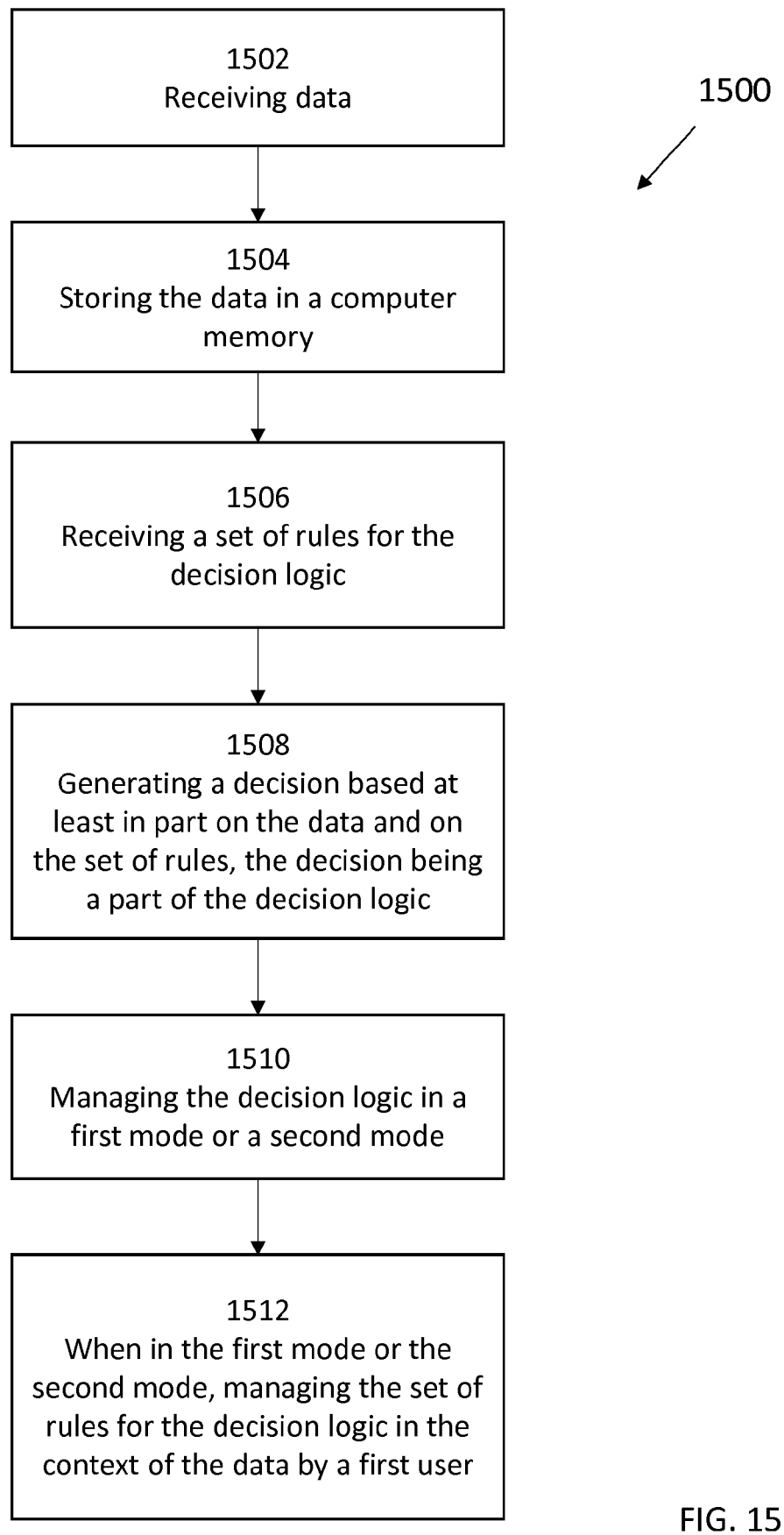
FIG. 15 depicts an example embodiment for a flowchart for managing the decision logic.

FIG. 15 depicts an example embodiment for a flowchart for managing the decision logic. The method for managing the decision logic 1500 starts at step 1502 by receiving data. At step 1504, the data is stored in a computer memory. At step

1506, a set of rules for the decision logic is received. At step 1508, a decision is generated based at least in part on the data and on the set of rules, and is a part of the decision logic. At step 1510, the decision logic is managed in a first mode or a second mode. At step 1512, when in the first mode or the second mode, the set of rules for the decision logic is managed in the context of the data by a first user. The managing includes reviewing the set of rules for the decision logic in the context of the data. The managing includes editing the set of rules for the decision logic in the context of the data. The editing is done by at least one of (i) modifying a rule in the set of rules, (ii) creating another rule and adding it to the set of rules and (iii) making an exception to a rule in the set of rules.

Figure 16:
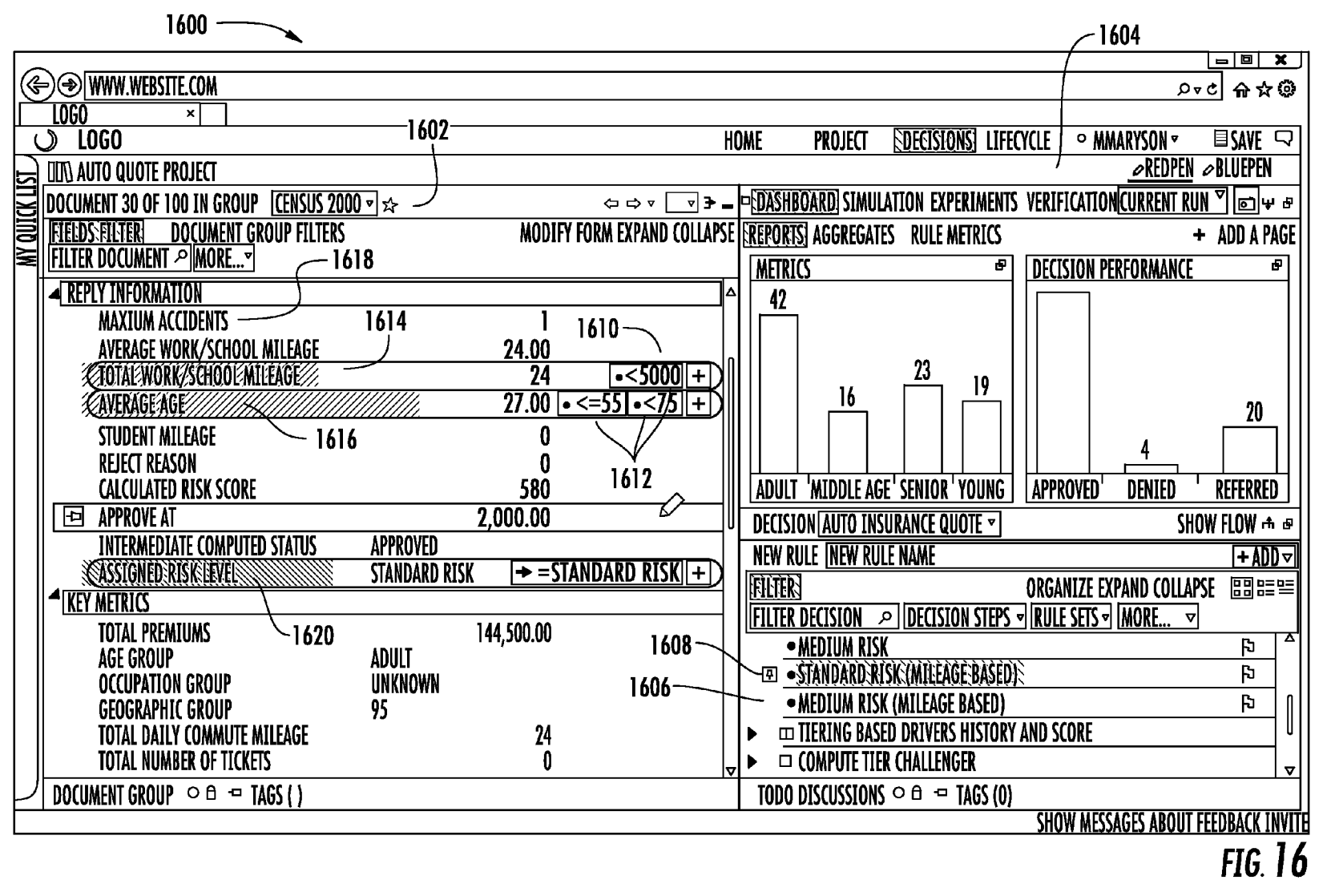

FIG. 16 depicts an example embodiment for managing the decision logic in a first mode. For example, an analyst may be investigating the decision generated for a group of applicants, or documents, concerning an automobile quote. The decision is generated by receiving data, storing the data in a computer memory, and receiving a set of rules for the decision logic. The analyst may enter a first mode of operation which may be a text based representation including a form or report. In one embodiment, a user interface for managing the decision logic in a first mode 1600 may be divided into different sections. A left side section 1602 shows the data elements for a particular document. An upper right side 1604 illustrates reports created associated with the data elements for a particular document or for a group of documents. A lower right side 1606 lists the rules in the decision logic.

When a user selects a rule in the lower right side 1606, such as standard risk rule 1608, decision logic 1610 for that rule, standard risk rule 1608, is directly projected onto the form. The selection may be made by at least one of circling, clicking, typing, or highlighting the rule from the set of rules. This is shown by circling the data elements which contributed to the decision logic 1610 for the selected rule which is standard risk rule 1608. Stickers 1612 express the decision logic conditions. This is a way to present the standard risk rule 1608 to a user which is form based. This allows the user to manage, explore and create by clicking on the form.

Figure 17:
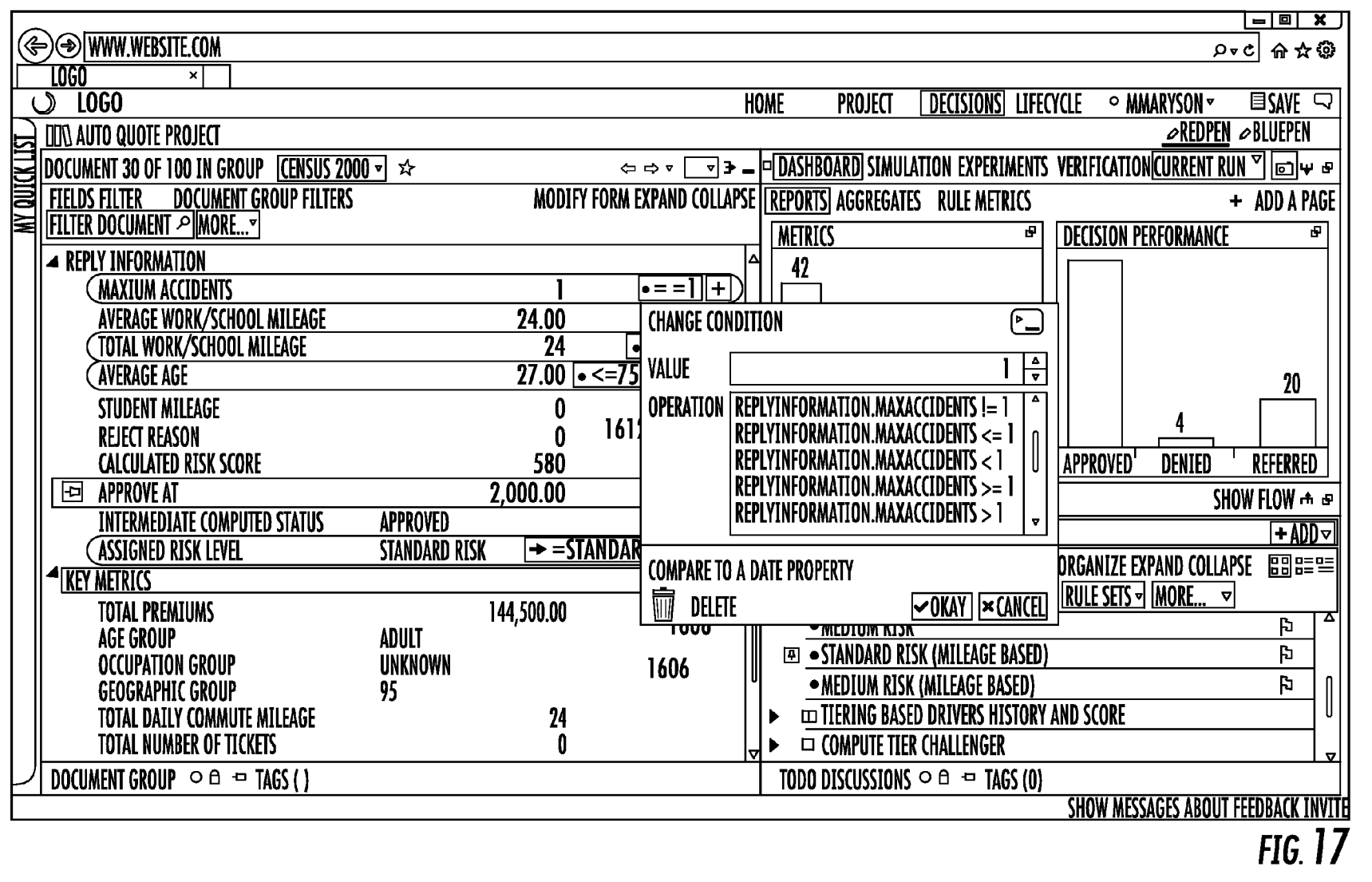

While in this first mode, the user may manage the set of rules for the decision logic in the context of the data. This may be by reviewing and editing the set of rules for the decision logic in the context of the data. For example, the user may choose to modify a specific rule, create a new rule or add an exception to a rule by entering the red pen editing mode which is the same process as described herein. FIG. 17 is an example embodiment for managing the set of rules for the decision logic in the context of the data by editing, while in the first mode.

Figure 18:
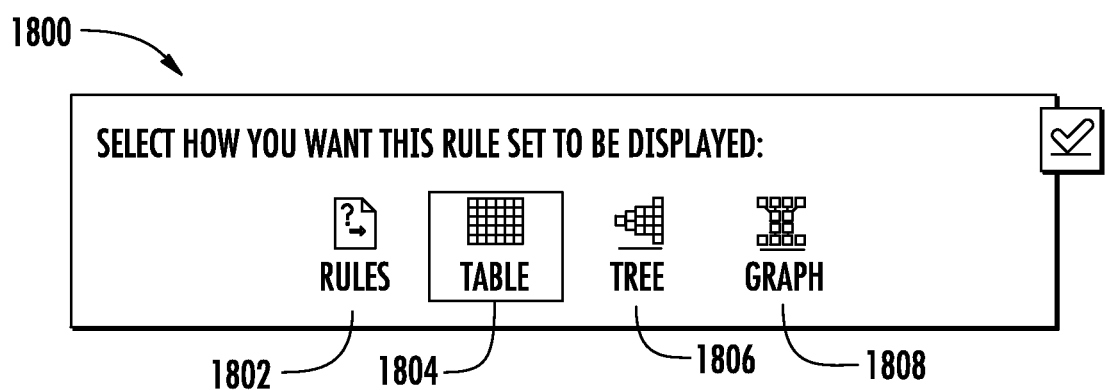
FIG. 18 is an example embodiment for a user interface.

The decision logic may also be managed in a second mode, referred to as fluid metaphors. The second mode may be a graphical representation including a table, decision tree or graph of the decision logic. It enables the user to manage the decision logic in alternative ways by different graphical perspectives. FIG. 18 is an example embodiment for a user interface for choosing the graphical representation 1800 while in the second mode or in fluid metaphors. In one embodiment, the user may choose a rules icon 1802, a table icon 1804, a tree icon 1806 or a graph icon 1808. When rules icon 1802 is chosen, the rules are displayed.

Figure 19:
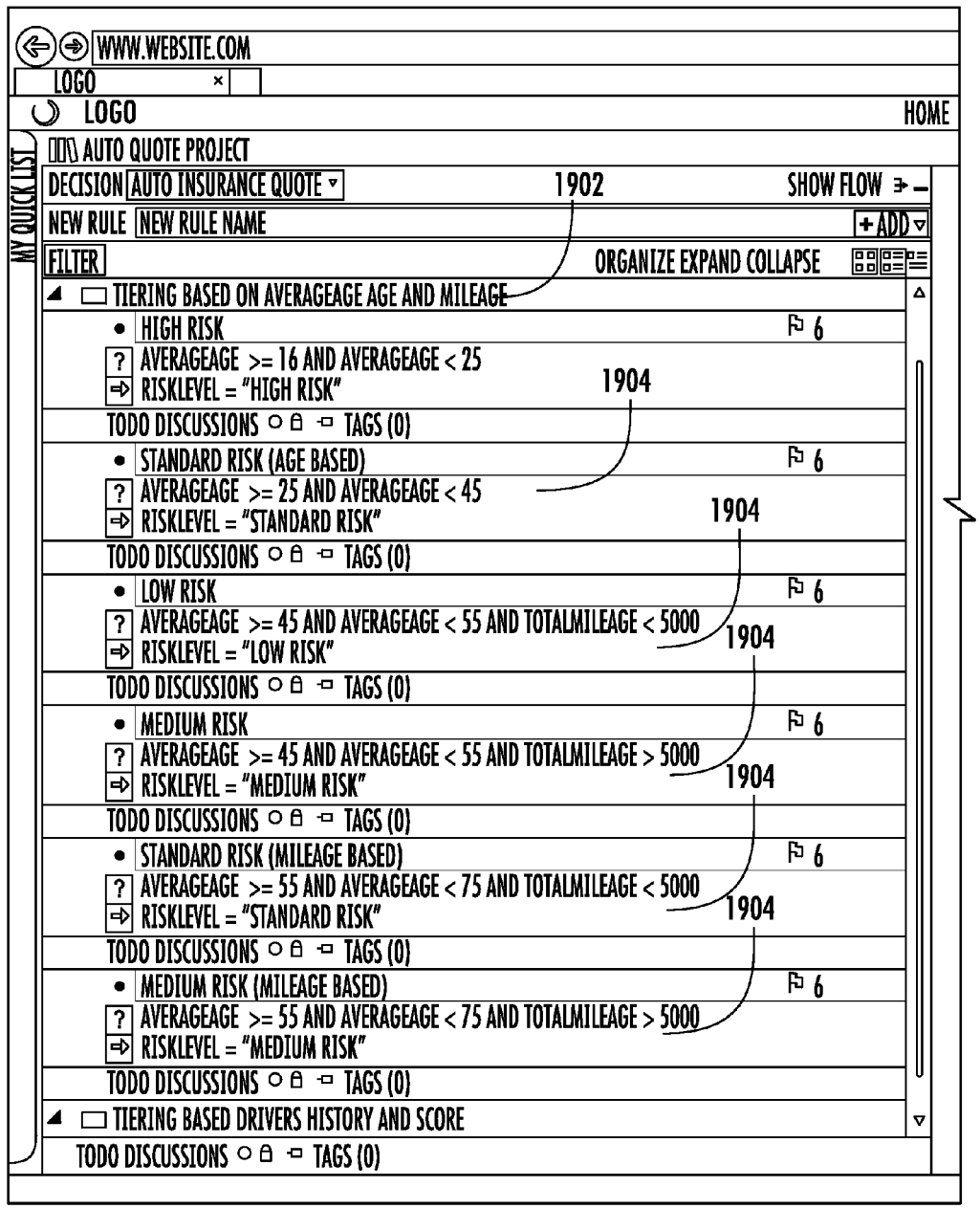
FIG. 19 is an example embodiment of the rules metaphor managing the rules associated with data

FIG. 19 is an example embodiment of the rules metaphor managing the rules associated with data. For example, based on the data of average age and mileage 1902, the rules and conditions 1904 are listed. These values may be viewed in a variety of graphical representations including a table, decision tree or graph.

Figure 20:
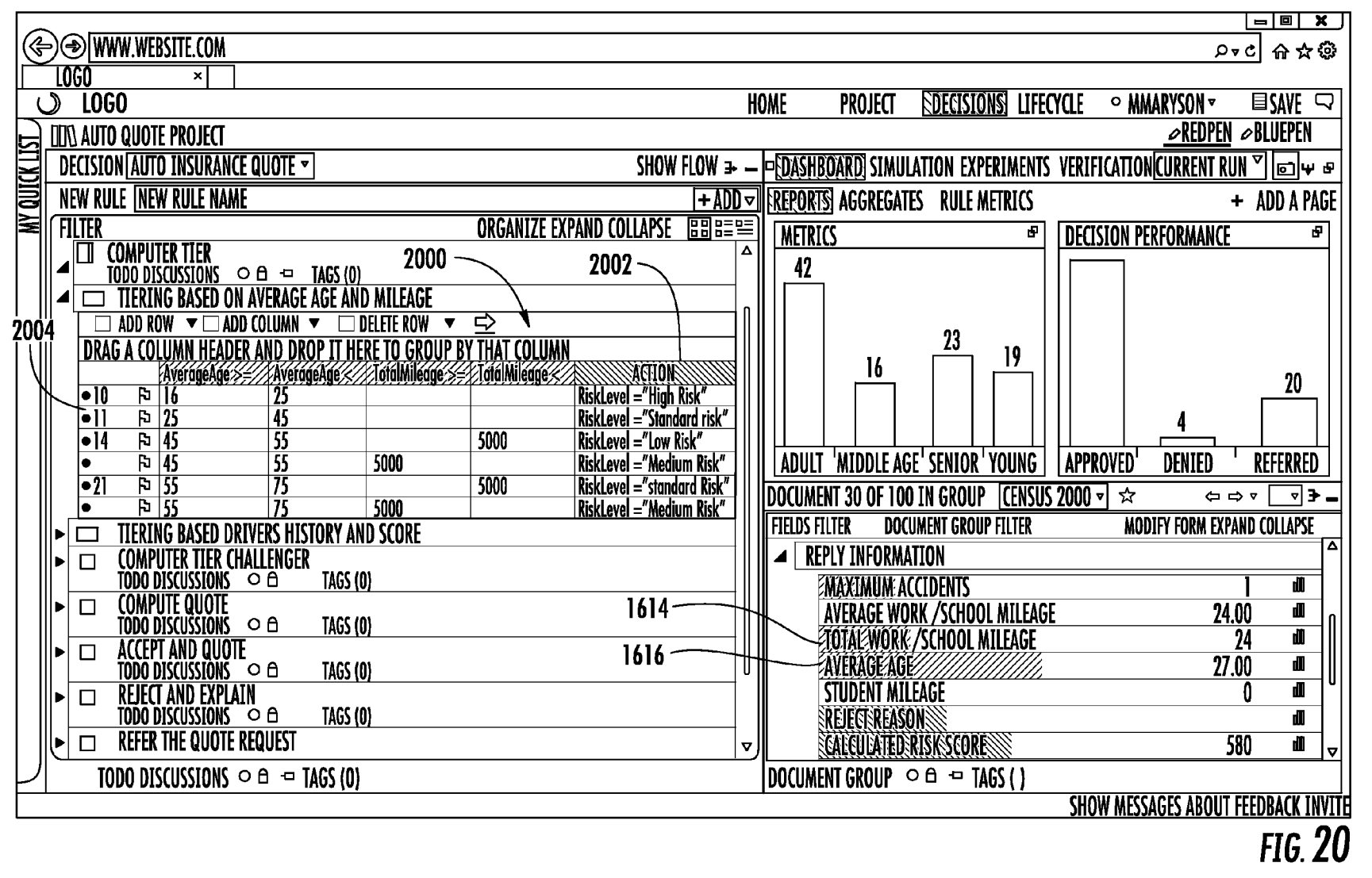

In a one implementation, the user chooses to manage the decision logic in a decision table fluid metaphor format by choosing the table icon 1804 in FIG. 18. FIG. 20 shows an example embodiment of a graphical representation, the decision table fluid metaphor, while in the second mode. The parameters used in the example of FIGS. 16 and 17 are used here but the decision logic is managed in a graphical representation as a decision table. Referring to FIG. 20, the decision table fluid metaphor 2000 shows the decision logic based on the average age and mileage by listing the rules in the rows (refer to FIG. 19 for the text of the rule) and the conditions in the columns with an action column 2002.

While in this second mode, the user may manage the set of rules for the decision logic in the context of the data. This may be by reviewing and editing the set of rules for the decision logic in the context of the data. For example, the user may choose to modify a specific rule, create a new rule or add an exception to a rule, as well as modify the conditions in the decision table fluid metaphor 2000. FIG. 21 is an example embodiment for managing the set of rules for the decision logic in the context of the data by editing, while in the second mode. The decision table fluid metaphor 2000 is shown and the user may create a new rule by using the edit icons 2102 such as add row, add column or delete row. For example, a new rule 2104 is created in row 7 with an additional condition 2106 in added column 5. In this new rule, if the average age of the driver is between 55 and 75, and the total mileage is less than 5000 miles, and the maximum amount of accidents is 1, then the action is a high risk level.

Figure 22:
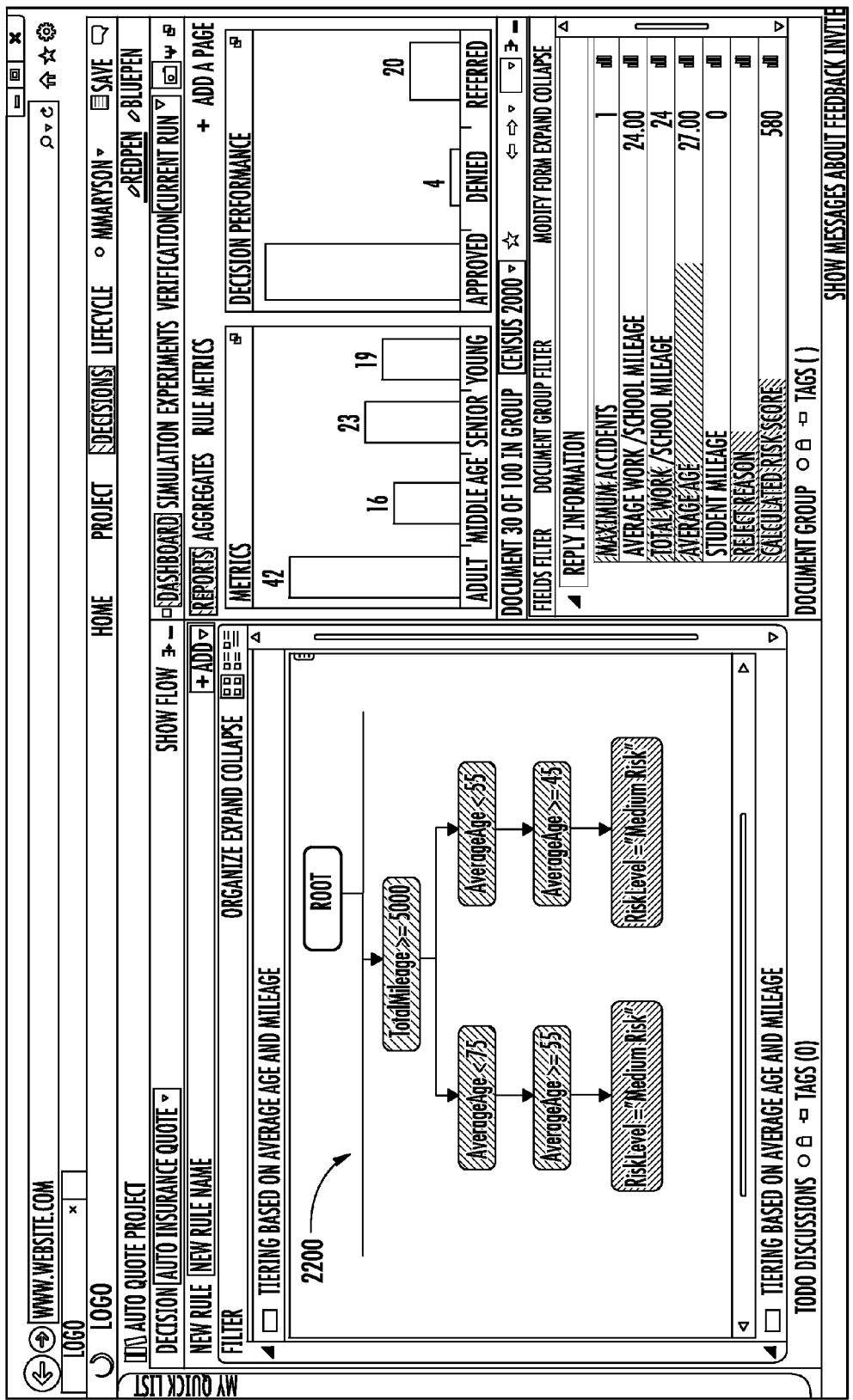
FIG. 22 shows an example embodiment of a graphical representation.

In another implementation, the user chooses to manage the decision logic in a decision tree fluid metaphor format by choosing the tree icon 1806 in FIG. 18. FIG. 22 shows an example embodiment of a graphical representation, the decision tree fluid metaphor, while in the second mode. The parameters used in the examples in FIGS. 16-17 and FIGS. 20-21 are used here but the decision logic is managed in a graphical representation as a decision tree. Referring to FIG. 22, the decision tree fluid metaphor 2200 shows the decision logic based on the average age and mileage by listing the rules/conditions and actions in nodes on the decision tree fluid metaphor 2200.

Figure 23:
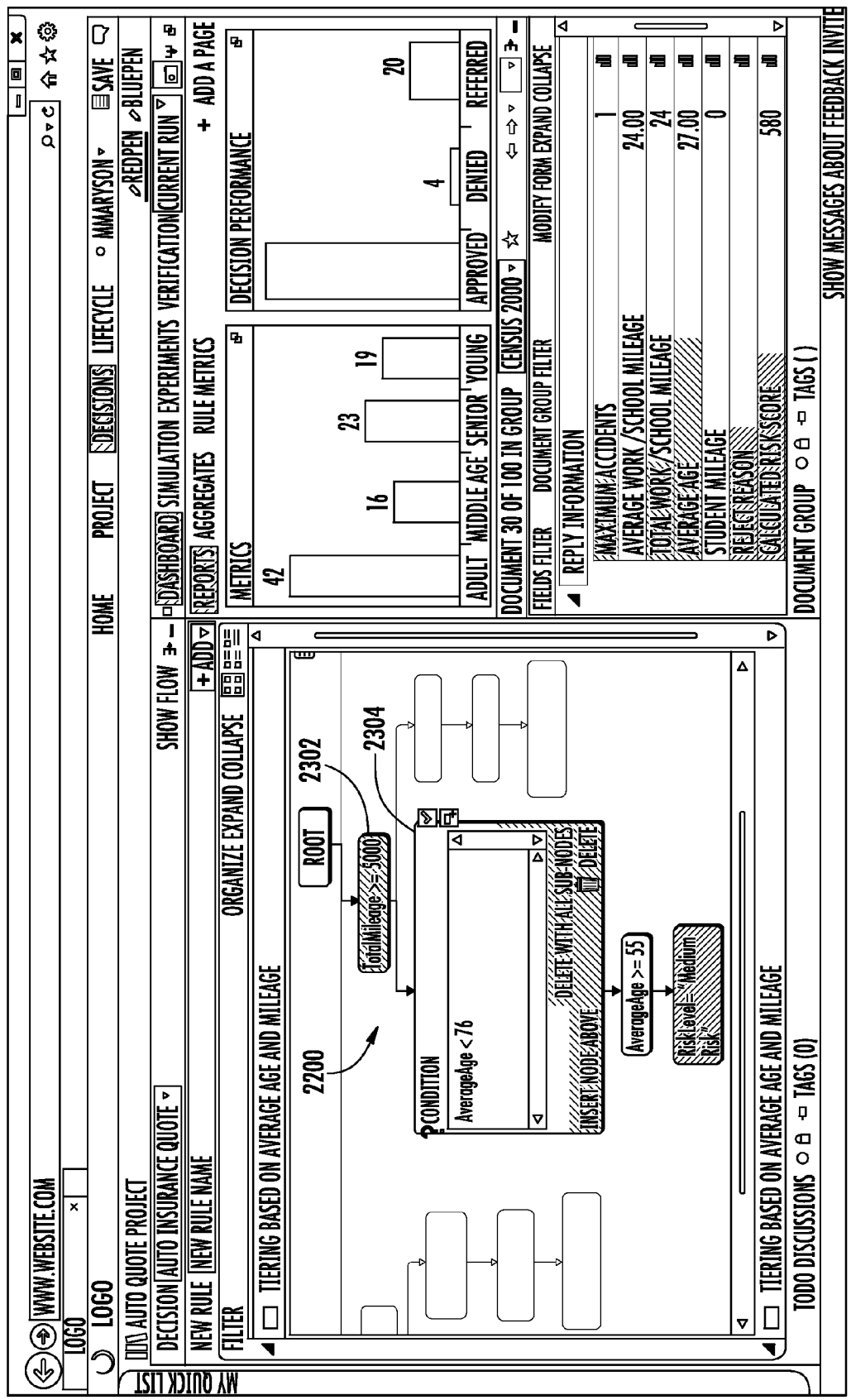
FIG. 23 depicts an example embodiment for managing the set of rules for the decision logic.

While in this second mode, the user may manage the set of rules for the decision logic in the context of the data. This may be by reviewing and editing the set of rules for the decision logic in the context of the data. For example, the user may choose to modify a specific rule, create a new rule or add an exception to a rule, as well as modify the conditions in the decision tree fluid metaphor 2200. FIG. 23 depicts an example embodiment for managing the set of rules for the decision logic in the context of the data by editing, while in the second mode. The decision tree fluid metaphor 2200 is shown and the user may modify a specific rule by selecting a node. For example, a condition 2202, total mileage >=5000 of the specific rule may be modified by selecting. The selection may be made by at least one of circling, clicking, typing, or highlighting. A drop down menu 2304 may appear and the user may edit the condition by choosing a new value. This may be accomplished by typing directly in the field or selecting a value from a menu.

Figure 24:
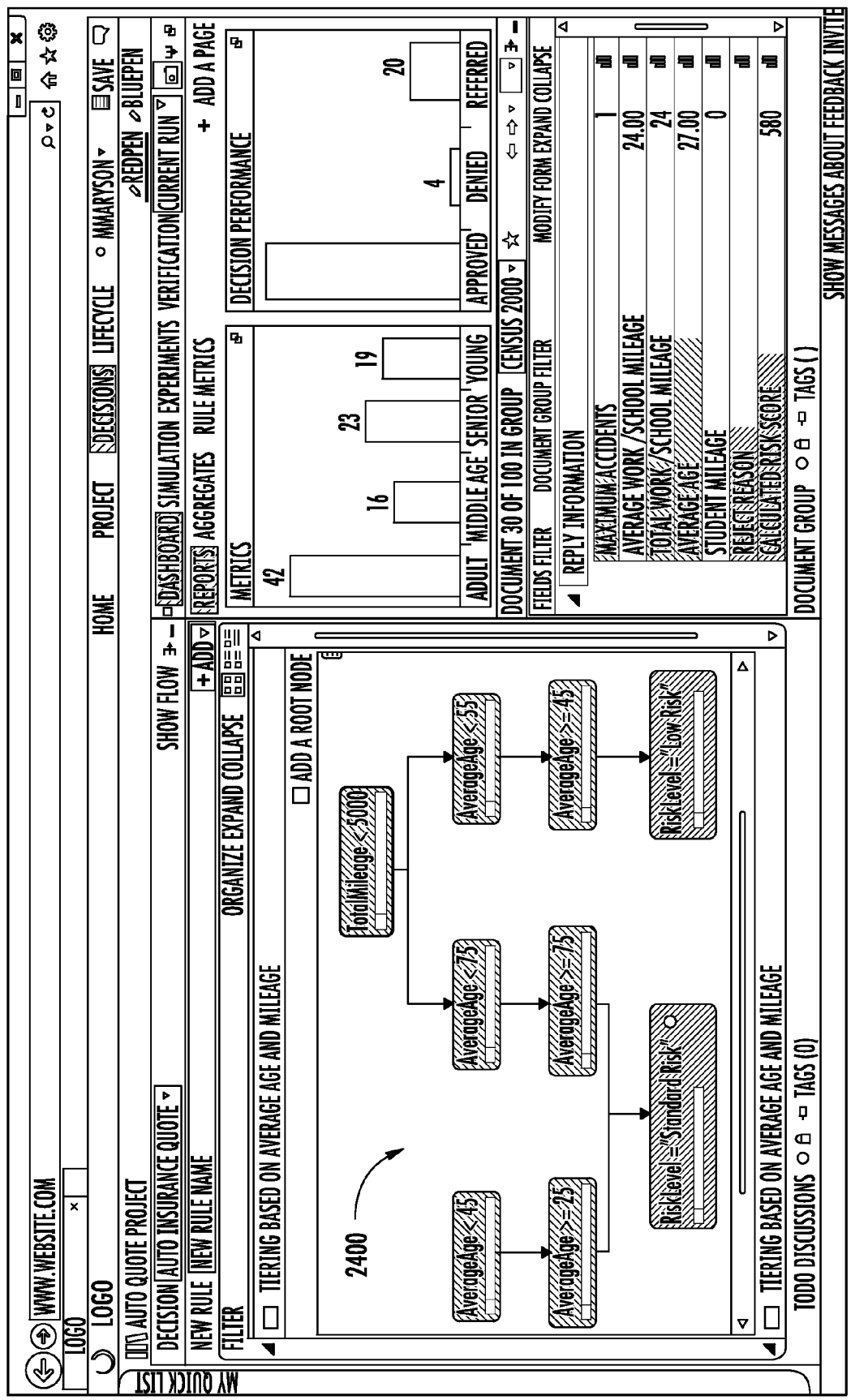
FIG. 24 shows an example embodiment of a graphical representation.

In yet another implementation, the user may choose to manage the decision logic in a decision graph fluid metaphor format by choosing the graph icon 1808 in FIG. 18. FIG. 24 shows an example embodiment of a graphical representation, the decision tree fluid metaphor, while in the second mode. The parameters used in the examples in FIGS. 16-17, FIGS. 20-21 and FIGS. 22-23 are used here but the decision logic is managed in a graphical representation as a decision graph.

Referring to FIG. 24, the decision graph fluid metaphor 2400 shows the decision logic based on the average age and mileage by listing the rules/conditions and actions in nodes on the decision graph fluid metaphor 2400.

Figure 25:
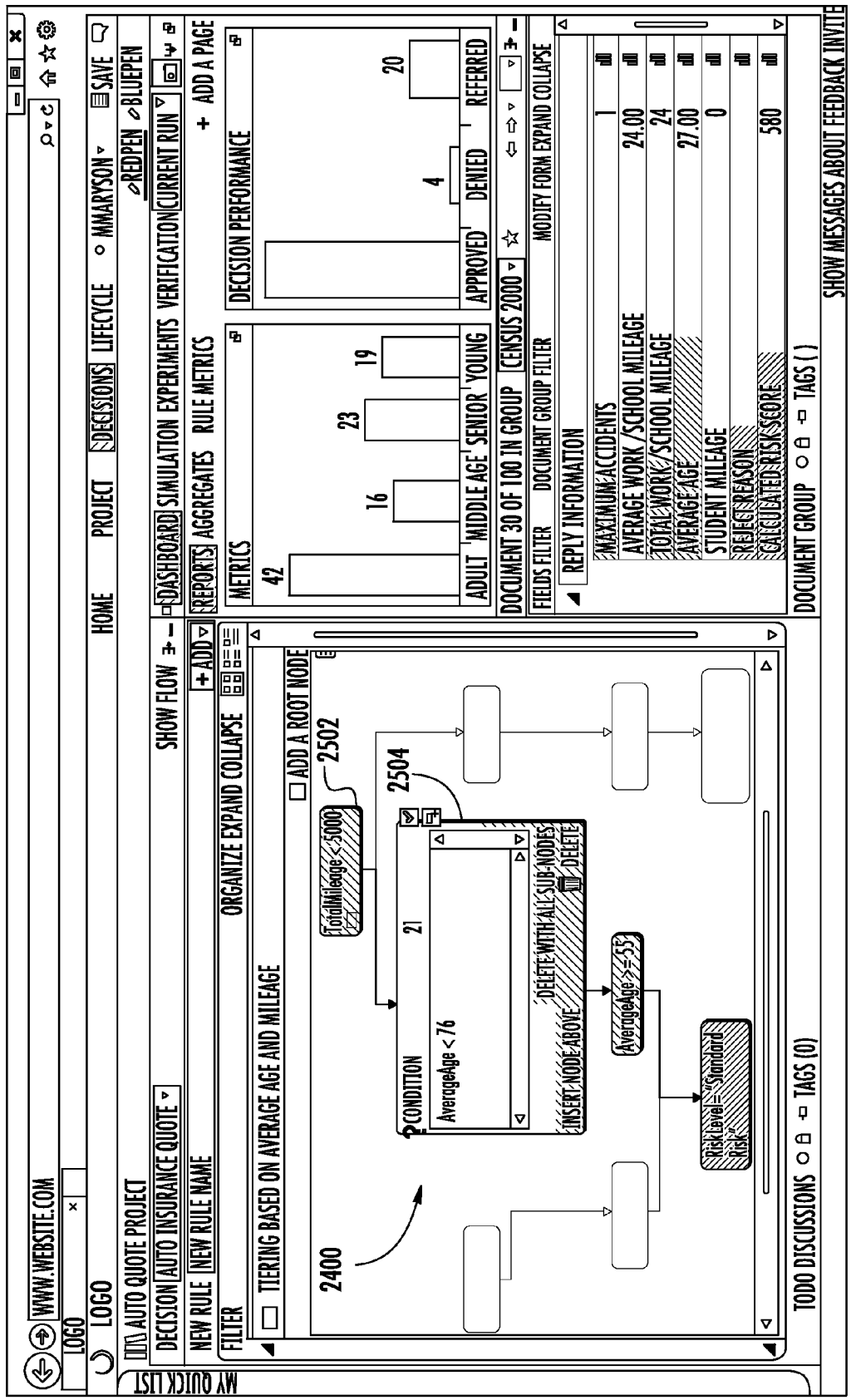
FIG. 25 is an example embodiment for managing the set of rules for the decision logic.

While in this second mode, the user may manage the set of rules for the decision logic in the context of the data. This may be by reviewing and editing the set of rules for the decision logic in the context of the data. For example, the user may choose to modify a specific rule, create a new rule or add an exception to a rule, as well as modify the conditions in the decision graph fluid metaphor 2400. FIG. 25 is an example embodiment for managing the set of rules for the decision logic in the context of the data by editing, while in the second mode. The decision graph fluid metaphor 2400 is shown and the user may modify a specific rule by selecting a node. For example, a condition 2502, total mileage <5000, of the specific rule may be modified by selecting it. A drop down menu 2504 may appear and the user may edit the condition by choosing a new value. This may be accomplished by typing directly in the field or selecting a value from a menu.

As demonstrated, the decision logic may be managed in a first mode being a text based representation including a form or report, or the decision logic may be managed in a second mode, known as fluid metaphors being a graphical representation including a table, decision tree or graph of the decision logic. The managing may be performed in the first mode or the second mode based on a preference of the user. For instance, the user may be more comfortable working with a form format therefore employing the first mode of operation. On the other hand, based on the particular aspect of the project, the user may use the second mode of operation to manage the decision logic in a compact format, such as a decision tree. The user may switch between the first mode and the second mode for managing the decision logic.

In one embodiment, the managing of the decision logic may be performed by a first user and a second user at the same time when the first user and the second user are in the same mode. In another embodiment, the managing of the decision logic may be performed by the first user and a second user at the same time when the first user and the second user are in different modes. In this way, multiple users may be managing the decision logic by reviewing, investigating and editing for the same project at the same time while in the first mode or second mode concurrently or while switching between modes. The decision logic may be managed in either the first mode or the second mode producing the same result but allowing the user to switch between views or change perspectives at any point in time.

The managing and execution by the first user may occur simultaneously during the method of managing decision logic. The user being guided through the process for decision logic for simultaneously authoring and executing until a desired output is reached, is a significant advancement in technology. In this way, editing the decision logic is in the context of data. For example, an editing tool may suggest to the user the contextual fields to use as part of the result based on automated decisions implemented at that point. The user may add contextual fields to include in the decision logic to be modified or added by selecting those fields in the context of the form. In other existing decisioning systems, the user enters data or select attributes in the abstract, in absence of data.

The method may further include, when in the first mode, displaying a graphical indicator to the first user. The graphical indicator may be associated with the data. The graphical indicator may represent information associated with the set of rules of the decision logic. In one implementation, when in the first mode, a selection of selected contextual data from the user is received. An impact of the selected contextual data on the decision logic may be calculated and a graphical indicator may be displayed. The graphical indicator may show the impact of the selected contextual data on the decision logic. The impact may include at least one of (i) whether the selected contextual data is used in a rule, the rule being included in the set of rules, (ii) a frequency of usage of the selected contextual data in the decision logic, (iii) a role of the selected contextual data in determining the decision, and (iv) usage information indicating an importance and correlation of the selected contextual data with respect to the decision.

For example, referring to FIG. 16 where the decision logic is managed in the first mode which is in a text based representation, the shading for a total work/school mileage 1614 and an average age 1616 provides a graphical indicator to the user. The graphical indicator indicates the total work/school mileage 1614 and the average age 1616 are used in the decision logic, and the average age 1616 is used more frequently than the total work/school mileage 1614 in the decision logic. A maximum accidents 1618 does not have a significant role in the decision logic. An assigned risk level 1620 is also used frequently.

Additionally, the method may further include, when in the second mode, displaying a graphical indicator to the first user. The graphical indicator may be associated with the data. The graphical indicator may represent information associated with the set of rules of the decision logic. In another implementation, when in the second mode, a selection of selected contextual data from the user is received. An impact of the selected contextual data on the decision logic may be calculated and a graphical indicator may be displayed. The graphical indicator may show the impact of the selected contextual data on the decision logic. The impact may include at least one of (i) whether the selected contextual data is used in a rule, the rule being included in the set of rules, (ii) a frequency of usage of the selected contextual data in the decision logic, (iii) a role of the selected contextual data in determining the decision, and (iv) usage information indicating an importance and correlation of the selected contextual data with respect to the decision.

For example, referring to FIG. 20 where the decision logic is managed in the second mode which is in a graphical representation, the shading for a total work/school mileage 1614 and an average age 1616 provide a graphical indicator to the user. The graphical indicator indicates the total work/school mileage 1614 and the average age 1616 are used in the decision logic, and the average age 1616 is used more frequently than the total work/school mileage 1614 in the decision logic. Also, listed in a first column 2004 are other graphical indicators for the user.

Disclosed herein is a non-transitory computer readable medium storing a program that when executed by a processor performs the method of investigating decision logic. The method includes receiving data, storing the data in a computer memory and receiving a set of rules for the decision logic. A decision based at least in part on the data and on the set of rules is generated. The decision is a part of the decision logic. When in a first investigative mode, a first graphical indicator is displayed to a user. The first graphical indicator is associated with the data and represents information associated with the set of rules of the decision logic. When in a second investigative mode, a second graphical indicator is displayed to the user. The second graphical indicator is associated with the set of rules of the decision logic and represents information associated with the data. The user switches between the first investigative mode and the second investigative mode based on a preference of the user. The second graphical indicator is a graphical rules editor. The second graphical rules editor includes at least one of (i) a first option to create a new rule based on the selected contextual data, (ii) a second option to create a new exception rule to an existing rule in the set of rules based on the selected contextual data, and (iii) a third option to modify the existing rule in the set of rules based on the selected contextual data.

In one embodiment, the method may further include receiving a selection of selected contextual data from the user and calculating an impact of the selected contextual data on the decision logic. The first graphical indicator may show the impact of the selected contextual data on the decision logic. The impact may include at least one of (i) whether the selected contextual data is used in a rule, the rule being included in the set of rules, (ii) a frequency of usage of the selected contextual data in the decision logic, (iii) a role of the selected contextual data in determining the decision, and (iv) usage information indicating an importance and correlation of the selected contextual data with respect to the decision.

In another embodiment, the method may further include receiving a selection of a selected rule from the set of rules from the user and calculating an impact of the selected rule from the set of rules on the decision logic. The second graphical indicator may show the impact of the selected rule from the set of rules on the decision logic. The impact may include at least one of (i) whether the selected rule, the rule being included in the set of rules, is used in the decision logic, (ii) a frequency of usage of the selected rule, the rule being included in the set of rules, in the decision logic, (iii) a role of the selected rule, the rule being included in the set of rules, in determining the decision, and (iv) usage information indicating an importance and correlation of the selected rule, the rule being included in the set of rules, with respect to the decision.

In one embodiment, the selection may include two rules from the set of rules and the second graphical indicator may be color-coded to show the impact of the rule from the set of rules on the decision logic.

In one embodiment, the first graphical indicator may be a graphical rules editor. The graphical rules editor may include at least one of (i) a first option to create a new rule based on the selected contextual data, (ii) a second option to create a new exception rule to an existing rule in the set of rules based on the selected contextual data, and (iii) a third option to modify the existing rule in the set of rules based on the selected contextual data. In another embodiment, the second graphical indicator may be a graphical rules editor. The graphical rules editor may include at least one of (i) a first option to create a new rule based on the selected contextual data, (ii) a second option to create a new exception rule to an existing rule in the set of rules based on the selected contextual data, and (iii) a third option to modify the existing rule in the set of rules based on the selected contextual data.

The investigation and execution may occur simultaneously during the method of investigating decision logic.

This method of investigating decision logic allows the user in a first investigative mode to explore and understand how selected data relates to the rules in the decision logic. A second investigative mode allows the user to explore and understand how selected rules relate to the data in the decision logic. The user may switch between the first investigative mode and the second investigative mode based on a preference of the user.

Figure 26:
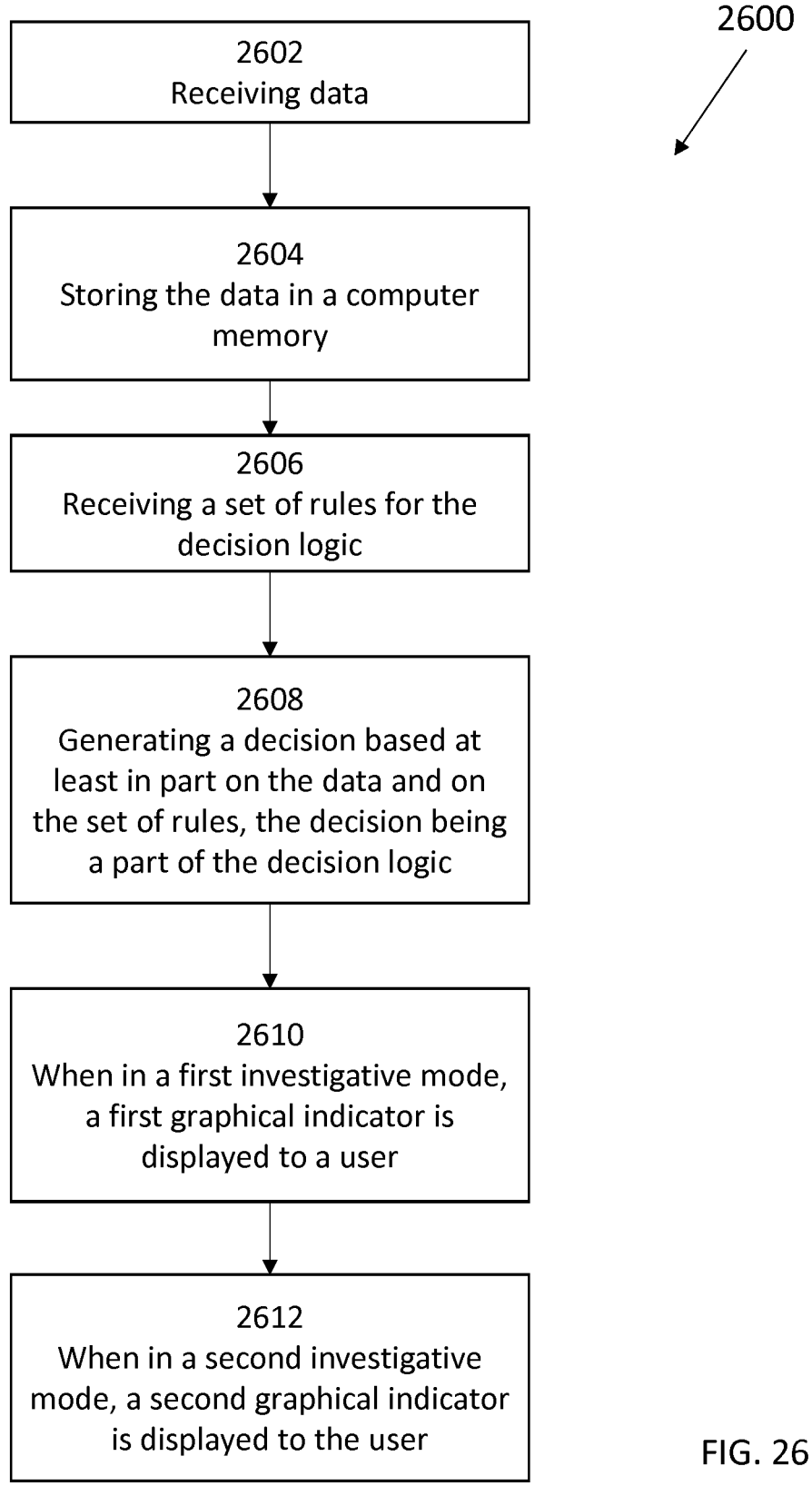
FIG. 26 is an example embodiment for a flowchart for a method for investigating decision logic.

FIG. 26 is an example embodiment for a flowchart for a method for investigating decision logic. The method for investigating decision logic 2600 starts at step 2602 by receiving data. At step 2605, the data is stored in a computer memory. At step 2606, a set of rules for the decision logic is received. At step 2608, a decision based at least in part on the data and on the set of rules is generated. The decision is a part of the decision logic. At step 2610, when in a first investigative mode, a first graphical indicator is displayed to a user. The first graphical indicator is associated with the data and represents information associated with the set of rules of the decision logic. At step 2612, when in a second investigative mode, a second graphical indicator is displayed to the user. The second graphical indicator is associated with the set of rules of the decision logic and represents information associated with the data. The user switches between the first investigative mode and the second investigative mode based on a preference of the user. The second graphical indicator is a graphical rules editor. The second graphical rules editor includes at least one of (i) a first option to create a new rule based on the selected contextual data, (ii) a second option to create a new exception rule to an existing rule in the set of rules based on the selected contextual data, and (iii) a third option to modify the existing rule in the set of rules based on the selected contextual data.

FIG. 27 is an example embodiment of a first investigative mode for a method of investigating decision logic. The method starts by receiving data, storing the data in a computer memory and receiving a set of rules for the decision logic. A decision based at least in part on the data and on the set of rules is generated. The decision is a part of the decision logic. When the user enters a first investigative mode, a graphical indicator is displayed to a user. The graphical indicator is associated with the data and represents information associated with the set of rules of the decision logic.

For example, an analyst may be investigating the decision generated for a group of applicants, or documents, concerning an automobile quote. When reviewing document 30 of a group of 100, the average age 1616 is highlighted indicating that it is used in the decision logic and in fact, based on the amount of highlighting, is used more frequently than total work/school mileage 1614. By scrolling over the average age 1616, more information is displayed such that it is used in 24 conditions and 0 actions. The selection may be made by at least one of circling, clicking, typing, or highlighting the rule from the set of rules.

By scrolling over other data elements such as total work/school mileage 1614, similar information may be displayed for that specific data element. The analyst may also peruse through any or all of the documents of the group of 100 and the graphical indication on the data elements may change for each document based on the involvement of the data element in the decision logic that the particular document. In another embodiment, the selection may include two fields of selected contextual data and the graphical indicator may be color-coded to show the impact of the selected contextual data on the decision logic.

Figure 28:
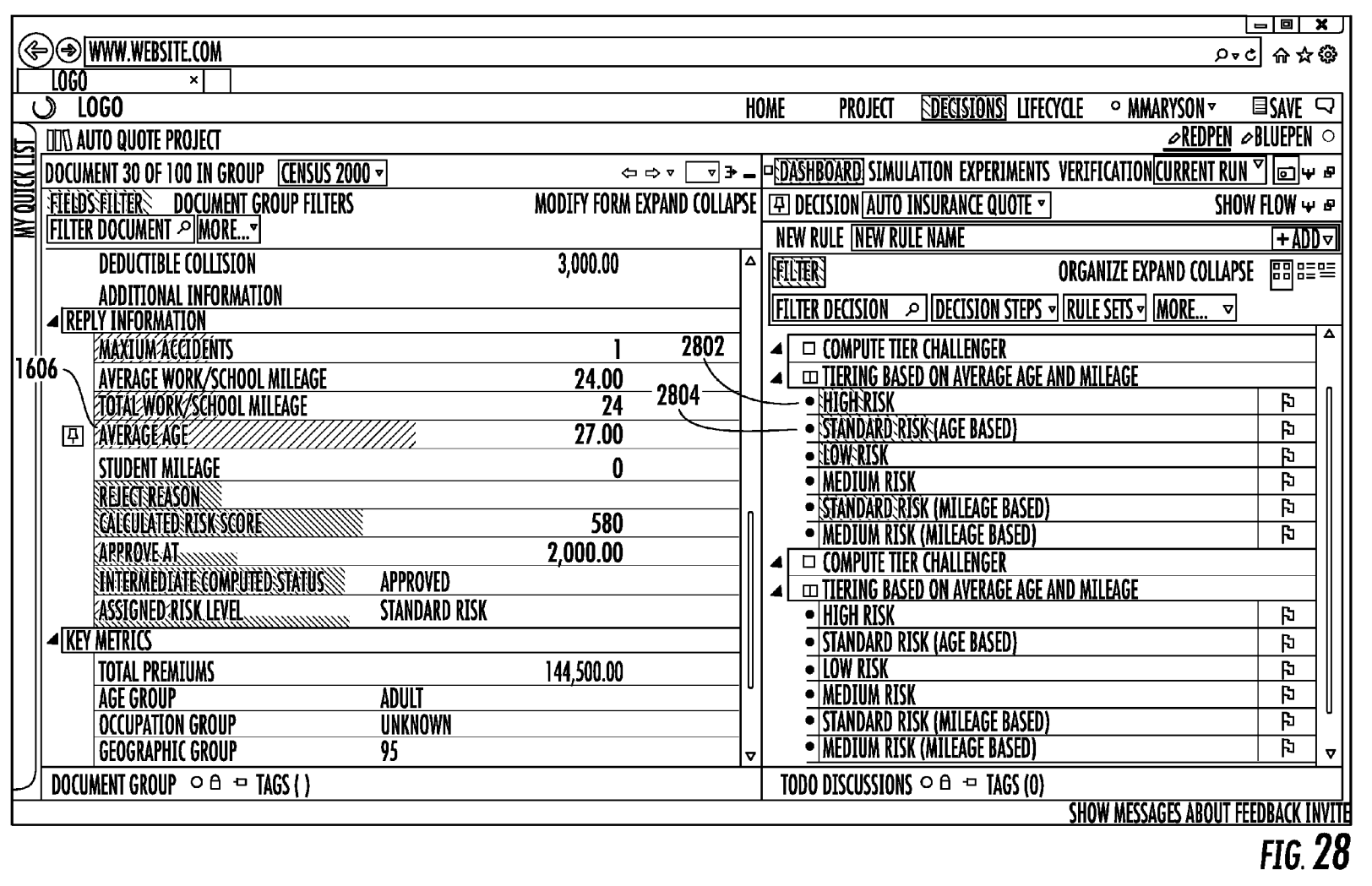

Furthermore, FIG. 28 illustrates an example embodiment for the first investigative mode for a method of investigating decision logic. The method further includes receiving a selection of selected contextual data from the user and calculating an impact of the selected contextual data on the decision logic. The graphical indicator may show the impact of the selected contextual data on the decision logic. The impact may include at least one of (i) whether the selected contextual data is used in a rule, the rule being included in the set of rules, (ii) a frequency of usage of the selected contextual data in the decision logic, (iii) a role of the selected contextual data in determining the decision, and (iv) usage information indicating an importance and correlation of the selected contextual data with respect to the decision.

For example, in the first investigative mode, when the average age 1616 is selected, all of the rules associated with it are displayed to the user in section 2802. In this case, there are six rules displayed. A graphical indicator such as highlighting is also present per rule showing whether or not it is used in the decision logic for the selected data in the document group, and based on the amount of highlighting, the frequency that it is used. A bubble 2804 indicates if that rule fires for the particular document selected.

This allows a user to trace a data element to a rule in the decision logic. In a second example, an analyst is reviewing decisions for automobile quotes for a group of users. The analyst decides that a decision cannot be generated based on age requirements due to discrimination concerns. Therefore, the age requirement in the decision needs to be edited. By using the first investigation mode, the analyst has the ability to identify what rules in the decision logic applies to age by clicking on the age related data elements and reviewing the related information displayed. It is also possible to trace a rule to a data element.

Figure 29:
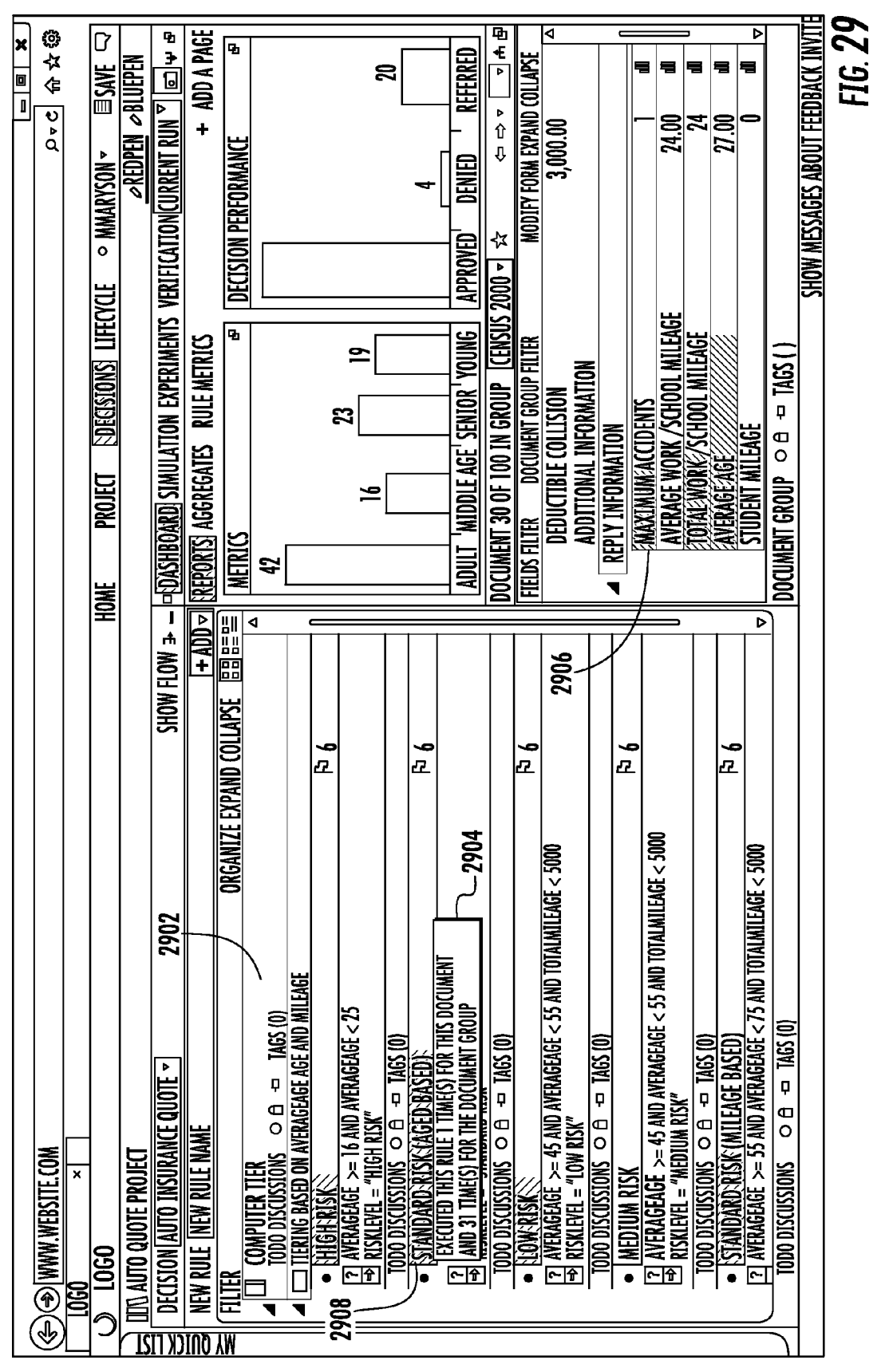

FIG. 29 depicts an example embodiment of a second investigative mode for a method of investigating decision logic. When in a second investigative mode, a second graphical indicator is displayed to the user. The second graphical indicator is associated with the set of rules of the decision logic and represents information associated with the data. The second graphical indicator is a graphical rules editor. The second graphical rules editor includes at least one of (i) a first option to create a new rule based on the selected contextual data, (ii) a second option to create a new exception rule to an existing rule in the set of rules based on the selected contextual data, and (iii) a third option to modify the existing rule in the set of rules based on the selected contextual data.

In this example, the previous example where an analyst may be investigating the decision for a group of applicants, or documents, concerning an automobile quote is used. When reviewing document 30 of a group of 100, the list of rules in the decision logic is displayed in section 2902. A standard risk (age based) 2904 is highlighted indicating that it is used in the decision logic for this group of documents per the data elements in region 2906. A bubble 2908 indicates that this rule fires for this particular document. Also, by scrolling over standard risk (age based) 2804, more information is displayed such as the rule is executed one time for this particular document 30 and executed 31 times for the document group of 100. The analyst may also peruse through any or all of the documents of the group of 100 and the graphical indication changes for each document. In another embodiment, the selection may include two rules from the set of rules and the graphical indicator may be color-coded to show the impact of the rule from the set of rules on the decision logic.

While in the second investigative mode, the user may manage the set of rules for the decision logic in the context of the data. For example, the user may choose to modify a specific rule, create a new rule or add an exception to a rule by entering an editing mode which is the same process as described herein.

Figure 30:
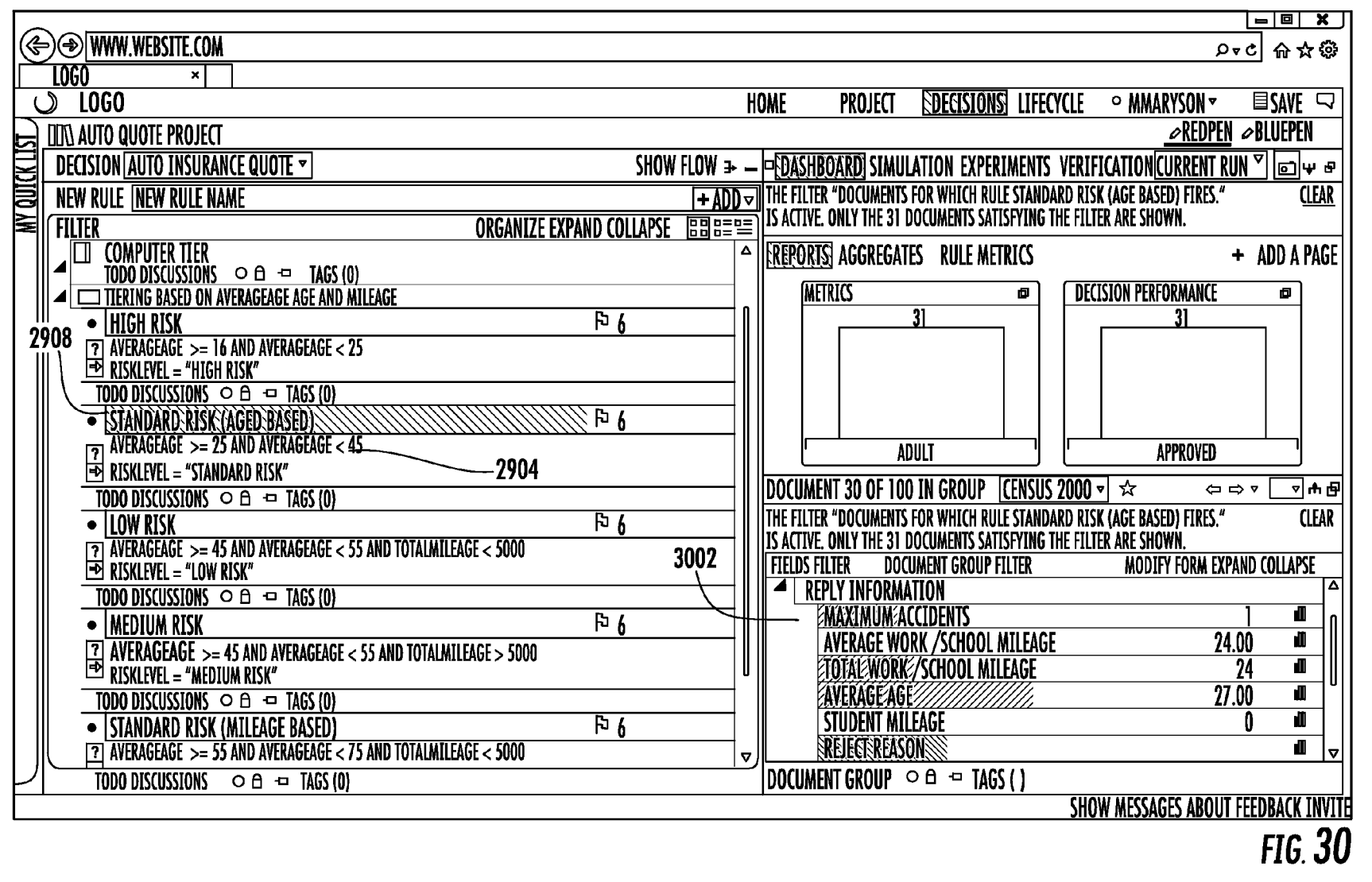

Moreover, FIG. 30 illustrates an example embodiment of the second investigative mode for a method of investigating decision logic. The method may further include receiving a selection of a selected rule from the set of rules from the user and calculating an impact of the selected rule from the set of rules on the decision logic. The graphical indicator may show the impact of the selected rule from the set of rules on the decision logic. The impact may include at least one of (i) whether the selected rule, the rule being included in the set of rules, is used in the decision logic, (ii) a frequency of usage of the selected rule, the rule being included in the set of rules, in the decision logic, (iii) a role of the selected rule, the rule being included in the set of rules, in determining the decision, and (iv) usage information indicating an importance and correlation of the selected rule, the rule being included in the set of rules, with respect to the decision.

For example, in the second investigative mode, the standard risk (age based) 2904 is highlighted indicating that it is used in the decision logic for this group of documents per the data elements. A bubble 2908 indicates that the rule fires for this particular document. The analyst may filter the documents to only include the documents that fire the standard risk (age based) 2904. The data elements are displayed in region 3002 for 31 of the documents in the group of 100 documents.

This allows a user to trace how a rule in the set of rules relates to the data in the decision logic. In a second example, an analyst may review decisions for automobile quotes for a group of users. The analyst may notice that the standard risk (age based) rule fires too frequently. The analyst may use the second investigation mode to determine the population of documents involved with relation to the age requirement. Based on this, the analyst may decide the age bracket is too broad and may make changes to shorten the age requirements.

While in the first investigative mode, the user may manage the set of rules for the decision logic in the context of the data. For example, the user may choose to modify a specific rule, create a new rule or add an exception to a rule by entering an editing mode which is the same process as described herein. For example, in one embodiment, when in the first investigative mode, the graphical indicator may be a graphical rules editor. The graphical rules editor may include at least one of (i) a first option to create a new rule based on the selected contextual data, (ii) a second option to create a new exception rule to an existing rule in the set of rules based on the selected contextual data, and (iii) a third option to modify the existing rule in the set of rules based on the selected contextual data.

Again, the investigation and execution may occur simultaneously during the method of investigating decision logic providing a significant advancement in technology as set forth above.

While the specification has been described in detail with respect to specific embodiments of the invention, it will be appreciated that those skilled in the art, upon attaining an understanding of the foregoing, may readily conceive of alterations to, variations of, and equivalents to these embodiments. These and other modifications and variations to the present invention may be practiced by those of ordinary skill in the art, without departing from the spirit and scope of the present invention, which is more particularly set forth in the appended claims. Furthermore, those of ordinary skill in the art will appreciate that the foregoing description is by way of example only, and is not intended to limit the invention. Thus, it is intended that the present subject matter covers such modifications and variations as come within the scope of the appended claims and their equivalents.

What is claimed is:

1. A non-transitory computer readable medium storing a program that when executed by a processor performs a method of managing decision logic, the method comprising:
   receiving data;
   storing the data in a computer memory;
   receiving a set of rules for the decision logic;
   generating a decision based at least in part on the data and on the set of rules, the decision being a part of the decision logic;
   providing an interface to a first user, the interface enabling editing of the set of rules in context of the data;

managing the decision logic in a first mode or a second mode; and when in the first mode or the second mode, managing the set of rules for the decision logic in the context of the data by the first user;

wherein the managing the set of rules includes reviewing the set of rules for the decision logic in the context of the data; and wherein the managing the set of rules includes the editing the set of rules for the decision logic in the context of the data, the editing done by at least one of (i) modifying a rule in the set of rules and (ii) creating another rule and adding it to the set of rules.

2. The method of claim 1, wherein the first mode is a text based representation including a form or report.

3. The method of claim 1, wherein the second mode is a graphical representation including a table, tree or graph.

4. The method of claim 1, wherein the managing is performed in the first mode or the second mode based on a preference of the first user.

5. The method of claim 1, wherein the first user switches between the first mode and the second mode for managing the decision logic.

6. The method of claim 1, wherein the managing is performed by the first user and a second user at the same time when the first user and the second user are in the same mode.

7. The method of claim 1, wherein the managing is performed by the first user and a second user at the same time when the first user and the second user are in different modes.

8. The method of claim 1, wherein the managing and execution by the first user occurs simultaneously during the method of managing decision logic.

9. The method of claim 1, the method further comprising:
when in the first mode, displaying a graphical indicator to the first user, the graphical indicator being associated with the data, the graphical indicator representing information associated with the set of rules of the decision logic.

10. The method of claim 1, the method further comprising:
when in the second mode, displaying a graphical indicator to the first user, the graphical indicator being associated with the data, the graphical indicator representing information associated with the set of rules of the decision logic.

11. The method of claim 1, the method further comprising:
when in the first mode, receiving a selection of selected contextual data from the user;
calculating an impact of the selected contextual data on the decision logic; and
displaying a graphical indicator, the graphical indicator showing the impact of the selected contextual data on the decision logic;
wherein the impact includes at least one of (i) whether the selected contextual data is used in a rule, the rule being included in the set of rules, (ii) a frequency of usage of the selected contextual data in the decision logic, (iii) a role of the selected contextual data in determining the decision, and (iv) usage information indicating an importance and correlation of the selected contextual data with respect to the decision.

12. The method of claim 1, the method further comprising:
when in the second mode, receiving a selection of selected contextual data from the user;
calculating an impact of the selected contextual data on the decision logic; and
displaying a graphical indicator, the graphical indicator showing the impact of the selected contextual data on the decision logic;
wherein the impact includes at least one of (i) whether the selected contextual data is used in a rule, the rule being included in the set of rules, (ii) a frequency of usage of the selected contextual data in the decision logic, (iii) a role of the selected contextual data in determining the decision, and (iv) usage information indicating an importance and correlation of the selected contextual data with respect to the decision.

13. A non-transitory computer readable medium storing a program that when executed by a processor performs a method of investigating decision logic, the method comprising:
receiving data;
storing the data in a computer memory;
receiving a set of rules for the decision logic;
generating a decision based at least in part on the data and on the set of rules, the decision being a part of the decision logic;
when in a first investigative mode, displaying a first graphical indicator to a user, the first graphical indicator being associated with the data, the first graphical indicator representing information associated with the set of rules of the decision logic; and
when in a second investigative mode, displaying a second graphical indicator to the user, the second graphical indicator being associated with the set of rules of the decision logic, the second graphical indicator representing information associated with the data;
wherein the user switches between the first investigative mode and the second investigative mode based on a preference of the user; and
wherein the second graphical indicator is a graphical rules editor, the second graphical rules editor including at least one of (i) a first option to create a new rule based on the selected contextual data and (ii) a second option to modify the existing rule in the set of rules based on the selected contextual data.

14. The method of claim 13, the method further comprising:
receiving a selection of selected contextual data from the user; and
calculating an impact of the selected contextual data on the decision logic;
wherein the first graphical indicator shows the impact of the selected contextual data on the decision logic.

15. The method of claim 14, wherein the impact includes at least one of (i) whether the selected contextual data is used in a rule, the rule being included in the set of rules, (ii) a frequency of usage of the selected contextual data in the decision logic, (iii) a role of the selected contextual data in determining the decision, and (iv) usage information indicating an importance and correlation of the selected contextual data with respect to the decision.

16. The method of claim 13, the method further comprising:
receiving a selection of a selected rule from the set of rules from the user; and
calculating an impact of the selected rule from the set of rules on the decision logic;
wherein the second graphical indicator shows the impact of the selected rule from the set of rules on the decision logic.

17. The method of claim 16, wherein the impact includes at least one of (i) whether the selected rule, the rule being included in the set of rules, is used in the decision logic, (ii) a frequency of usage of the selected rule, the rule being included in the set of rules, in the decision logic, (iii) a role of the selected rule, the rule being included in the set of rules, in determining the decision, and (iv) usage information indicating an importance and correlation of the selected rule, the rule being included in the set of rules, with respect to the decision.

18. The method of claim 16, wherein:
   the selection includes two rules from the set of rules; and
   the second graphical indicator is color-coded to show the impact of the rule from the set of rules on the decision logic.

19. The method of claim 13, wherein when in the first investigative mode, the first graphical indicator is a graphical rules editor, the graphical rules editor including at least one of (i) a first option to create a new rule based on the selected contextual data, (ii) a second option to create a new exception rule to an existing rule in the set of rules based on the selected contextual data, and (iii) a third option to modify the existing rule in the set of rules based on the selected contextual data.

20. The method of claim 13, wherein the investigation and execution occurs simultaneously during the method of investigating decision logic.

\* \* \* \* \*